US011108608B2

(12) United States Patent
Zhang et al.

(10) Patent No.: US 11,108,608 B2
(45) Date of Patent: *Aug. 31, 2021

(54) INFORMATION TRANSMISSION METHOD AND APPARATUS

(71) Applicant: Huawei Technologies Co., Ltd., Shenzhen (CN)

(72) Inventors: Xi Zhang, Chengdu (CN); Minghui Xu, Chengdu (CN); Lei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/922,692

(22) Filed: Jul. 7, 2020

(65) Prior Publication Data

US 2020/0336354 A1 Oct. 22, 2020

Related U.S. Application Data

(63) Continuation of application No. 16/518,574, filed on Jul. 22, 2019, now Pat. No. 10,715,367, which is a (Continued)

(30) Foreign Application Priority Data

Jun. 13, 2017 (CN) .......................... 201710444084.1
Sep. 30, 2017 (CN) .......................... 201710920235.6

(51) Int. Cl.
*H04L 27/26* (2006.01)
*H04L 5/00* (2006.01)
*H04L 27/20* (2006.01)

(52) U.S. Cl.
CPC ........ *H04L 27/2627* (2013.01); *H04L 5/0007* (2013.01); *H04L 5/0048* (2013.01); *H04L 27/20* (2013.01); *H04L 27/2614* (2013.01)

(58) Field of Classification Search
CPC ... H04B 7/01; H04B 7/02; H04B 7/06; H04B 7/0417; H04J 11/00; H04J 13/00;
(Continued)

(56) References Cited

U.S. PATENT DOCUMENTS 10,715,367 B2 * 7/2020 Zhang ................ H04L 27/2613
2004/0218687 A1 11/2004 Santhoff
(Continued)

FOREIGN PATENT DOCUMENTS

CN 102882825 A 1/2013
CN 106534017 A 3/2017
(Continued)

OTHER PUBLICATIONS

U.S. Appl. No. 16/518,574, filed Jul. 22, 2019.
(Continued)

*Primary Examiner* — Shawkat M Ali
(74) *Attorney, Agent, or Firm* — Leydig, Voit & Mayer, Ltd.

(57) ABSTRACT

An information transmission method related to the field of communications technologies includes: generating an orthogonal frequency division multiplexing (OFDM) symbol, where the OFDM symbol includes a pi/2-BPSK modulated data signal and a pi/2-binary phase shift keying (BPSK) modulated phase tracking reference signal (PTRS); and sending the OFDM symbol. This method may be applied to an uplink single carrier transmission scenario or a downlink single carrier transmission scenario.

23 Claims, 10 Drawing Sheets

Related U.S. Application Data continuation of application No. PCT/CN2018/090913, filed on Jun. 12, 2018.

(58) Field of Classification Search
CPC .......... H04J 13/0062; H04L 1/00; H04L 1/16; H04L 5/00; H04L 5/0007; H04L 5/0048; H04L 25/02; H04L 27/20; H04L 27/26; H04L 27/34; H04L 27/2614; H04L 27/2627; H04L 27/3411; H04W 72/04; H04W 72/0446
USPC ........ 370/209, 342, 441, 479; 375/130, 219, 375/259, 260, 267, 316
See application file for complete search history.

(56) References Cited

U.S. PATENT DOCUMENTS

| | | | |
|---|---|---|---|
| 2009/0110033 | A1 | 4/2009 | Shattil |
| 2010/0124291 | A1 | 5/2010 | Muharemovic et al. |
| 2012/0213176 | A1 | 8/2012 | Kwak et al. |
| 2016/0261140 | A1 | 9/2016 | Won et al. |
| 2017/0201989 | A1 | 7/2017 | Fakoorian et al. |
| 2019/0081844 | A1 | 3/2019 | Lee et al. |
| 2019/0356463 | A1* | 11/2019 | Zhang .................. H04W 80/08 |
| 2019/0356515 | A1 | 11/2019 | Murakami et al. |
| 2020/0076558 | A1* | 3/2020 | Kuchi .................. H04J 13/004 |

FOREIGN PATENT DOCUMENTS

| | | |
|---|---|---|
| CN | 107196735 A | 9/2017 |
| JP | 2019504384 A | 2/2019 |
| WO | 2017044420 A1 | 3/2017 |
| WO | 2018163657 A1 | 9/2018 |
| WO | 2018228460 A1 | 12/2018 |
| WO | 2019095905 A1 | 5/2019 |

OTHER PUBLICATIONS

"On PT-RS for DFT-s-OFDM," 3GPP TSG-RAN WG1 #89, R1-1707367, Hangzhou, China, pp. 1-6, 3rd Generation Partnership Project—Valbonne, France (May 15-19, 2017).

"Next Steps for pi/2 BPSK with spectrum shaping," 3GPP TSG RAN WG1 Meeting #89, R1-1708222, Hangzhou, China, pp. 1-2, 3rd Generation Partnership Project—Valbonne, France (May 15-19, 2017).

"3rd Generation Partnership Project; Technical Specification Group Radio Access Network; NR; Physical channels and modulation (Release 15)," 3GPP TS 38.211, V0.0.0, pp. 1-10, 3rd Generation Partnership Project—Valbonne, France (May 2017).

"3rd Generation Partnership Project; Technical Specification Group Radio Access Network; NR; Radio Resource Control (RRC); Protocol specification (Release 15 )," 3GPP TS 38.331, V0.0.3, pp. 1-20, 3rd Generation Partnership Project—Valbonne, France (May 2017).

"On UE single-tone EVM," 3GPP TSG-RAN WG4 Meeting #78, St. Julian's, Malta, R4-160618, pp. 1-3, 3rd Generation Partnership Project, Valbonne, France (Feb. 15-19, 2016).

"Phase-tracking reference signal for DFT-s-OFDM systems," 3GPP TSG RAN WG1 Meeting #88bis, Spokane, USA, R1-1705101, total 5 pages, 3rd Generation Partnership Project, Valbonne, France (Apr. 3-7, 2017).

"Summary of email discussion [84-11] on DM-RS and phase rotation for NB-IoT," 3GPP TSG RAN WG1 NB-IoT Ad-Hoc Meeting, Sophia Antipolis, France, R1-161972, total 8 pages, 3rd Generation Partnership Project, Valbonne, France (Mar. 22-24, 2016).

Qualcomm Incorporated, "Phase and frequency tracking reference signal considerations," 3GPP TSG-RAN WG1 #89, Hangzhou, P.R. China, R1-1708599, total 7 pages, 3rd Generation Partnership Project, Valbonne, France (May 15-19, 2017).

Mitsubishi Electric, "UL PTRS for DFTsOFDM waveform," 3GPP TSG-RAN WG1 #89, Hangzhou, China, R1-1708997, total 8 pages, 3rd Generation Partnership Project, Valbonne, France (May 15 -19, 2017).

* cited by examiner

INFORMATION TRANSMISSION METHOD AND APPARATUS

CROSS-REFERENCE TO RELATED APPLICATIONS

This application is a continuation of U.S. patent application Ser. No. 16/518,574, filed on Jul. 22, 2019, which is a continuation of International Application No. PCT/CN2018/090913, filed on Jun. 12, 2018, which claims priority of Chinese Patent Application No. 201710920235.6, filed on Sep. 30, 2017 and Chinese Patent Application No. 201710444084.1, filed on Jun. 13, 2017. All of the aforementioned patent applications are hereby incorporated by reference in their entireties.

TECHNICAL FIELD

Embodiments of this application relate to the field of communications technologies, and in particular, to an information transmission method and apparatus.

BACKGROUND

Factors such as a Doppler effect, a central frequency offset (CFO), and phase noise may cause a phase error to data signal reception in a communications system, resulting in performance degradation or even failure of the communications system. To resolve this technical problem, a transmit end device may insert a phase tracking reference signal (PTRS) into a data signal. A receive end device first estimates a phase error of the PTRS, and then obtains a phase error of the data signal through operations such as filtering and/or interpolation, thereby implementing phase error compensation for the data signal.

In a communications system, a peak-to-average power ratio (PAPR) of a single carrier is relatively low, and therefore, a single carrier may be used for an uplink waveform. However, during data signal transmission using a single carrier, if a PTRS is inserted into a data signal, a PAPR of the communications system may be increased, and therefore an advantage of the single carrier cannot be well utilized.

SUMMARY

This application provides an information transmission method and apparatus, so that a low-PAPR advantage of a single carrier is well utilized.

According to a first aspect, this application provides an information transmission method and apparatus.

In a possible embodiment, this application provides an information transmission method. The method may be performed by a transmit end device, where the transmit end device is a terminal in an uplink direction, or the transmit end device is a base station in a downlink direction. The method may include: generating one or more orthogonal frequency division multiplexing (OFDM) symbols, where each of some or all of the OFDM symbols may include a pi/2 ($\pi/2$)-binary phase shift keying (BPSK) data signal and a pi/2-BPSK modulated PTRS. This technical solution may be applied to a single carrier transmission scenario. In this technical solution, the PTRS in the OFDM symbol is a pi/2-BPSK modulated PTRS, increasing randomness of the PTRS compared with the prior art in which the PTRS is a QPSK-modulated PTRS. As randomness increases, system performance becomes more stable, so that a low-PAPR characteristic of a single carrier is well utilized.

In a possible embodiment, the method may further include: phase-shifting a BPSK modulated PTRS, to obtain the pi/2-BPSK modulated PTRS, where the PTRS includes one or more PTRS blocks, each PTRS block includes one or more BPSK symbols, and the BPSK symbol in each PTRS block is phase-shifted according to a pi/2 progressive increase rule.

In a possible embodiment, the method may further include: phase-shifting a BPSK modulated PTRS, to obtain the pi/2-BPSK modulated PTRS, where the PTRS includes one or more PTRS blocks, each PTRS block includes one or more BPSK symbols, and the BPSK symbol in each PTRS block is phase-shifted according to a pi/2 progressive decrease rule.

The foregoing provides two technical solutions for generating the pi/2-BPSK modulated PTRS, neither of which limits a phase-shifting rule between the PTRS blocks. In addition, the pi/2-BPSK modulated PTRS may be obtained in the following manners, for example, but not limited to: The pi/2-BPSK modulated PTRS is preset; or the BPSK symbols in each of some PTRS blocks in the BPSK modulated PTRS are phase-shifted according to a pi/2 progressive increase rule, and the BPSK symbols in each of the other PTRS blocks are phase-shifted according to a pi/2 progressive decrease rule.

It should be noted that, usually, the BPSK symbols in the PTRS block are phase-shifted by 0, pi/2, pi, 3pi/2, . . . , sequentially based on an arrangement order, or are phase-shifted by 0, −pi/2, −pi/2, −pi/2, . . . , sequentially based on an arrangement order. Certainly, this is not limited thereto. Therefore, if a PTRS block includes one BPSK symbol, both phase-shifting the BPSK symbol in the PTRS block according to a pi/2 progressive increase rule and phase-shifting the BPSK symbol in the PTRS block according to a pi/2 progressive decrease rule may be understood as phase-shifting the BPSK symbol in the PTRS block by zero. In other words, the BPSK symbol in the PTRS block is not phase-shifted.

In a possible embodiment, that the BPSK symbol in each PTRS block is phase-shifted according to a pi/2 progressive increase rule may include: phase-shifting BPSK symbols in a sequence based on an arrangement order of the BPSK symbols in the sequence according to the pi/2 progressive increase rule, where the sequence is a sequence that is obtained by inserting the BPSK modulated PTRS into a BPSK modulated data signal. The transmit end device may learn of an order of the BPSK symbols in the sequence before inserting the BPSK modulated PTRS into the BPSK modulated data signal. This application does not limit an order in which the transmit end device performs insertion and phase shifting. The possible design may be considered as phase-shifting the data signal and the PTRS as a whole. In this way, computational complexity of both a receive end device and a transmit end device can be reduced.

In a possible embodiment, that the BPSK symbol in each PTRS block is phase-shifted according to a pi/2 progressive increase rule may include: phase-shifting BPSK symbols in the BPSK modulated PTRS based on an arrangement order of the BPSK symbols in the BPSK modulated PTRS according to a pi/2 progressive increase rule. The possible design may be considered as phase-shifting the data signal and the PTRS independently. In this way, computational complexity of both a receive end device and a transmit end device can be reduced.

In a possible embodiment, that the BPSK symbol in each PTRS block is phase-shifted according to a pi/2 progressive decrease rule may include: phase-shifting BPSK symbols in a sequence based on an arrangement order of the BPSK symbols in the sequence according to the pi/2 progressive decrease rule, where the sequence is a sequence that is obtained by inserting the BPSK modulated PTRS into a BPSK modulated data signal. The possible design may be considered as phase-shifting the data signal and the PTRS as a whole. In this way, computational complexity of both a receive end device and a transmit end device can be reduced.

In a possible embodiment, that the BPSK symbol in each PTRS block is phase-shifted according to a pi/2 progressive decrease rule may include: phase-shifting BPSK symbols in the BPSK modulated PTRS based on an arrangement order of the BPSK symbols in the BPSK modulated PTRS according to the pi/2 progressive decrease rule. The possible design may be considered as phase-shifting the data signal and the PTRS independently. In this way, computational complexity of both a receive end device and a transmit end device can be reduced.

In a possible embodiment, the method further includes: inserting the BPSK modulated PTRS into the BPSK modulated data signal, before the BPSK modulated PTRS is phase-shifted.

In a possible embodiment, the method further includes: inserting the pi/2-BPSK modulated PTRS into a pi/2-BPSK modulated data signal after the BPSK modulated PTRS is phase-shifted.

Correspondingly, this application further provides an information transmission apparatus, which can implement the information transmission method in the first aspect. For example, the information transmission apparatus may be a chip (such as a baseband chip or a communications chip) or a transmit end device (such as a base station or a terminal). The foregoing method may be implemented by software or hardware or by hardware executing corresponding software.

In a possible embodiment, the information transmission apparatus includes a processor and a memory. The processor is configured to support the apparatus in performing a corresponding function in the foregoing information transmission method. The memory is configured to be coupled to the processor, store a program (instruction) and data for the apparatus. Optionally, the information transmission apparatus may further include a communications interface, configured to support communication between the apparatus and another network element. The communications interface may be a transceiver.

In a possible embodiment, the apparatus may include a processing unit. The processing unit is configured to generate one or more OFDM symbols, where each of some or all of the OFDM symbols may include a pi/2-BPSK modulated data signal and a pi/2-BPSK modulated PTRS.

In a possible embodiment, the processing unit may be further configured to phase-shift a BPSK modulated PTRS, to obtain the pi/2-BPSK modulated PTRS, where the PTRS includes one or more PTRS blocks, each PTRS block includes one or more BPSK symbols, and the BPSK symbol in each PTRS block is phase-shifted according to a pi/2 progressive increase rule. Optionally, the processing unit may be specifically configured to phase-shift BPSK symbols in a sequence based on an arrangement order of the BPSK symbols in the sequence according to the pi/2 progressive increase rule, where the sequence is a sequence that is obtained by inserting the BPSK modulated PTRS into a BPSK modulated data signal. Alternatively, the processing unit may be specifically configured to phase-shift BPSK symbols in the BPSK modulated PTRS based on an arrangement order of the BPSK symbols in the BPSK modulated PTRS according to the pi/2 progressive increase rule.

In a possible embodiment, the processing unit may be further configured to phase-shift a BPSK modulated PTRS, to obtain the pi/2-BPSK modulated PTRS, where the PTRS includes one or more PTRS blocks, each PTRS block includes one or more BPSK symbols, and the BPSK symbol in each PTRS block is phase-shifted according to a pi/2 progressive decrease rule. Optionally, the processing unit may be specifically configured to phase-shift BPSK symbols in a sequence based on an arrangement order of the BPSK symbols in the sequence according to the pi/2 progressive decrease rule, where the sequence is a sequence that is obtained by inserting the BPSK modulated PTRS into a BPSK modulated data signal. Alternatively, the processing unit may be specifically configured to phase-shift BPSK symbols in the BPSK modulated PTRS based on an arrangement order of the BPSK symbols in the BPSK modulated PTRS according to the pi/2 progressive decrease rule.

In a possible embodiment, the processing unit may be further configured to insert the BPSK modulated PTRS into the BPSK modulated data signal, before the BPSK modulated PTRS is phase-shifted.

In a possible embodiment, the processing unit may be further configured to insert the pi/2-BPSK modulated PTRS into a pi/2-BPSK modulated data signal after the BPSK modulated PTRS is phase-shifted.

According to a second aspect, this application provides an information transmission method and apparatus.

In a possible embodiment, this application provides an information transmission method. The method may be performed by a transmit end device. The method may include: generating one or more OFDM symbols, where each of some or all of the OFDM symbols may include a pi/2-BPSK modulated data signal and a pi/2-BPSK modulated PTRS; and sending the OFDM symbol. For specific implementations and beneficial effects of generating the pi/2-BPSK modulated data signal, refer to the corresponding technical solution in the first aspect. Details are not described herein again.

In a possible embodiment, the method may further include: determining, based on a modulation and coding scheme (MCS), that a modulation scheme of the data signal is pi/2-BPSK. Optionally, when the MCS is greater than or equal to 0 and less than or equal to a preset value, it is determined that the modulation scheme of the data signal is pi/2-BPSK, where the preset value is 4, 6, or 8.

Correspondingly, this application further provides an information transmission apparatus, configured to implement the information transmission method in the second aspect. The apparatus may be implemented by software or hardware or by hardware executing corresponding software. The hardware or software includes one or more modules corresponding to the foregoing functions.

In a possible embodiment, a structure of the apparatus includes a processor, a memory, and a communications interface. The processor is configured to support the apparatus in performing a corresponding function in the second aspect. The communications interface is configured to support communication between the apparatus and another network element. The memory is configured to: be coupled to the processor, and store a program instruction and data for the apparatus. The communications interface may be specifically a transceiver.

In a possible embodiment, the apparatus may include a processing unit and a sending unit. The processing unit is configured to generate one or more OFDM symbols, where each of some or all of the OFDM symbols may include a pi/2-BPSK modulated data signal and a pi/2-BPSK modulated PTRS. The sending unit is configured to send the OFDM symbol. For the function of the processing unit, refer to the corresponding technical solution in the first aspect. Details are not described herein again.

In a possible embodiment, the processing unit is further configured to determine, based on an MCS, that a modulation scheme of the data signal is pi/2-BPSK. Optionally, when the MCS is greater than or equal to 0 and less than or equal to a preset value, it is determined that the modulation scheme of the data signal is pi/2-BPSK, where the preset value is 4, 6, or 8.

According to a third aspect, this application further provides an information transmission method and apparatus.

In a possible embodiment, this application provides an information transmission method. The method may be performed by a receive end device, where the receive end device is a base station in an uplink direction, or the receive end device is a terminal in a downlink direction. The method may include: receiving one or more OFDM symbols, where each of some or all of the OFDM symbols includes a pi/2-BPSK modulated data signal and a pi/2-BPSK modulated PTRS; and demodulating the pi/2-BPSK modulated data signal based on the pi/2-BPSK modulated PTRS.

In a possible embodiment, the demodulating the pi/2-BPSK modulated data signal based on the pi/2-BPSK modulated PTRS may include: phase-shifting the pi/2-BPSK modulated PTRS, and demodulating the pi/2-BPSK modulated data signal based on a phase-shifted PTRS, where the PTRS includes one or more PTRS blocks, each PTRS block includes one or more BPSK symbols, and the BPSK symbol in each PTRS block is phase-shifted according to a pi/2 progressive increase rule.

In a possible embodiment, that the BPSK symbol in each PTRS block is phase-shifted according to a pi/2 progressive increase rule may include: phase-shifting BPSK symbols in the OFDM symbol based on an arrangement order of the BPSK symbols in the OFDM symbol according to the pi/2 progressive increase rule.

In a possible embodiment, that the BPSK symbol in each PTRS block is phase-shifted according to a pi/2 progressive increase rule may include: phase-shifting BPSK symbols in the pi/2-BPSK modulated PTRS based on an arrangement order of the BPSK symbols in the pi/2-BPSK modulated PTRS according to the pi/2 progressive increase rule.

In a possible embodiment, the demodulating the pi/2-BPSK modulated data signal based on the pi/2-BPSK modulated PTRS may include: phase-shifting the pi/2-BPSK modulated PTRS, and demodulating the pi/2-BPSK modulated data signal based on the phase-shifted PTRS, where the PTRS includes one or more PTRS blocks, each PTRS block includes one or more BPSK symbols, and the BPSK symbol in each PTRS block is phase-shifted according to a pi/2 progressive decrease rule.

In a possible embodiment, that the BPSK symbol in each PTRS block is phase-shifted according to a pi/2 progressive decrease rule may include: phase-shifting BPSK symbols in the OFDM symbol based on an arrangement order of the BPSK symbols in the OFDM symbol according to the pi/2 progressive decrease rule.

In a possible embodiment, that the BPSK symbol in each PTRS block is phase-shifted according to a pi/2 progressive decrease rule may include: phase-shifting BPSK symbols in the pi/2-BPSK modulated PTRS based on an arrangement order of the BPSK symbols in the pi/2-BPSK modulated PTRS according to the pi/2 progressive decrease rule.

It may be understood that, phase shifting performed by a receive end device is related to phase shifting performed by a transmit end device. For a related manner, refer to the following specific implementations. Details are not redundantly repeated herein.

Correspondingly, this application further provides an information transmission apparatus, configured to implement the information transmission method in the third aspect. The apparatus may be implemented by software or hardware or by hardware executing corresponding software. The hardware or software includes one or more modules corresponding to the foregoing functions.

In a possible embodiment, a structure of the apparatus includes a processor, a memory, and a communications interface. The processor is configured to support the apparatus in performing a corresponding function in the third aspect. The communications interface is configured to support communication between the apparatus and another network element. The memory is configured to: be coupled to the processor, and store a program instruction and data for the apparatus. The communications interface may be specifically a transceiver.

In a possible embodiment, the apparatus may include a receiving unit and a processing unit. The receiving unit is configured to receive one or more OFDM symbols, where each of some or all of the OFDM symbols includes a pi/2-BPSK modulated data signal and a pi/2-BPSK modulated PTRS. The processing unit is configured to demodulate the pi/2-BPSK modulated data signal and the pi/2-BPSK modulated PTRS.

In a possible embodiment, the processing unit may be specifically configured to phase-shift the pi/2-BPSK modulated PTRS, and demodulate the pi/2-BPSK modulated data signal based on the phase-shifted PTRS, where the PTRS includes one or more PTRS blocks, each PTRS block includes one or more BPSK symbols, and the BPSK symbol in each PTRS block is phase-shifted according to a pi/2 progressive increase rule. Optionally, that the processing unit may be specifically configured to phase-shift the BPSK symbol in each PTRS block according to a pi/2 progressive increase rule may include: phase-shifting BPSK symbols in the OFDM symbol based on an arrangement order of the BPSK symbols in the OFDM symbol according to the pi/2 progressive increase rule. Alternatively, the processing unit may be specifically configured to phase-shift BPSK symbols in the pi/2-BPSK modulated PTRS based on an arrangement order of the BPSK symbols in the pi/2-BPSK modulated PTRS according to the pi/2 progressive increase rule.

In a possible embodiment, the processing unit may be specifically configured to phase-shift the pi/2-BPSK modulated PTRS, and demodulate the pi/2-BPSK modulated data signal based on the phase-shifted PTRS, where the PTRS includes one or more PTRS blocks, each PTRS block includes one or more BPSK symbols, and the BPSK symbol in each PTRS block is phase-shifted according to a pi/2 progressive decrease rule. Optionally, that the processing unit may be specifically configured to phase-shift the BPSK symbol in each PTRS block according to a pi/2 progressive decrease rule may include: phase-shifting BPSK symbols in the OFDM symbol based on an arrangement order of the BPSK symbols in the OFDM symbol according to the pi/2 progressive decrease rule. Alternatively, the processor may be specifically configured to phase-shift BPSK symbols in the pi/2-BPSK modulated PTRS based on an arrangement order of the BPSK symbols in the pi/2-BPSK modulated PTRS according to the pi/2 progressive decrease rule.

In a possible embodiment, the processing unit is further configured to determine, based on an MCS, that a modulation scheme of the data signal is pi/2-BPSK. Optionally, when the MCS is greater than or equal to 0 and less than or equal to a preset value, it is determined that the modulation scheme of the data signal is pi/2-BPSK, where the preset value is 4, 6, or 8.

In a possible embodiment, a transmit end generates an orthogonal frequency division multiplexing OFDM symbol, where the OFDM symbol includes a $\pi/2$ pi/2-binary phase shift keying BPSK modulated phase tracking reference signal PTRS; and the transmit end sends the OFDM symbol.

In the implementations of the foregoing possible embodiments, the method may further include: phase-shifting a BPSK modulated PTRS, to obtain the pi/2-BPSK modulated PTRS, where the PTRS includes one or more PTRS blocks, each PTRS block includes one or more BPSK symbols, and the BPSK symbol in each PTRS block is phase-shifted according to a pi/2 progressive increase rule. In an embodiment, that the BPSK symbol in each PTRS block is phase-shifted according to a pi/2 progressive increase rule includes: phase-shifting the PTRS based on a location of a PTRS symbol in the OFDM symbol; or phase-shifting the PTRS based on a location of a PTRS symbol in a PTRS sequence. Optionally, the transmit end may further perform power boosting on the PTRS symbol, and the transmit end may determine a power boosting value based on a modulation scheme of a data signal in the OFDM symbol. The transmit end may further determine the modulation scheme of the data signal based on a modulation and coding scheme MCS. In another embodiment, the OFDM symbol is a discrete Fourier transform spread DFT-s-OFDM symbol. The transmit end may include a processing unit, configured to generate the orthogonal frequency division multiplexing OFDM symbol, and the transmit end further includes a sending unit, configured to send the OFDM symbol. In another embodiment, the transmit end may include a processor and a transmitter, configured to generate the OFDM symbol and send the OFDM symbol, respectively. In another embodiment, the transmit end apparatus may be a chip or a chip system.

In the implementations of the foregoing possible embodiments, a pi/2-BPSK modulated PTRS received signal is phase-shifted, to obtain a BPSK modulated PTRS received signal, where the PTRS received signal includes one or more PTRS blocks, each PTRS block includes one or more pi/2-BPSK symbols, and the pi/2-BPSK symbol in each PTRS block is phase-shifted according to a pi/2 progressive increase rule. In a possible implementation, that the pi/2-BPSK symbol in each PTRS block is phase-shifted according to a pi/2 progressive increase rule includes: phase-shifting the PTRS based on a location of a PTRS symbol in the OFDM symbol; or phase-shifting the PTRS based on a location of a PTRS symbol in the PTRS received signal.

In a possible design, an information transmission method includes: receiving, by a receive end, an orthogonal frequency division multiplexing OFDM symbol, where the OFDM symbol includes a $\pi/2$ pi/2-binary phase shift keying BPSK modulated phase tracking reference signal PTRS; and demodulating, by the receive end, a data signal based on the pi/2-BPSK modulated PTRS. In an embodiment, the method further includes: phase-shifting a BPSK modulated PTRS sequence, to obtain the pi/2-BPSK modulated PTRS sequence, where the PTRS includes one or more PTRS blocks, each PTRS block includes one or more BPSK symbols, and the BPSK symbol in each PTRS block is phase-shifted according to a pi/2 progressive increase rule. In an embodiment, that the receive end phase-shifts the BPSK symbol in each PTRS block according to a pi/2 progressive increase rule may be: phase-shifting the PTRS based on a location of a PTRS symbol in the OFDM symbol; or phase-shifting the PTRS based on a location of a PTRS symbol in a PTRS sequence. The OFDM symbol is a discrete Fourier transform spread DFT-s-OFDM symbol. The receive end may include a receiving unit, configured to receive the OFDM symbol, and the receive end may further include a processing unit, configured to demodulate the data signal. In another embodiment, the receive end may include a receiver and a processor, configured to receive the OFDM symbol and demodulate the data signal, respectively. In an embodiment, a transmit end may be a chip or a chip system.

In any one of the possible designs provided above, the OFDM symbol may be, for example, but not limited to, any one of a DFT-s-OFDM symbol, a ZT-DFT-s-OFDM symbol, or UW-DFT-s-OFDM, or may be a symbol of a DFT-s-OFDM varied or evolved waveform, or the like, where DFT is an English acronym for discrete Fourier transform, ZT is an English acronym for zero tail, UW is an English acronym for unique word, and s is short for spread.

This application further provides a computer storage medium, storing a computer program (instruction). When the program (instruction) is run on a computer, the computer is enabled to perform the method according to any one of the foregoing aspects.

This application further provides a computer program product. When the computer program product is run on a computer, the computer is enabled to perform the method according to any one of the foregoing aspects.

It may be understood that, any one of the apparatuses, the computer readable storage medium, or the computer program product provided above is configured to perform the corresponding methods provided above. For beneficial effects that can be achieved by the foregoing methods, refer to beneficial effects of corresponding solutions in the following embodiments. Details are not redundantly repeated herein.

DESCRIPTION OF EMBODIMENTS

Technical solutions provided in this application may be applied to various communications systems that use single carrier transmission technologies, for example, a communications system that uses a single carrier transmission technology on the basis of an existing communications system, a 5G communications system, a future evolved system, or a system that integrates various types of communication. A plurality of application scenarios may be included, for example, machine to machine (M2M), D2D, macro-micro communication, enhanced mobile broadband (eMBB), ultra reliable and low latency communication (uRLLC), and massive machine type communication (mMTC). These scenarios may include, but are not limited to: a scenario of communication between terminals, a scenario of communication between base stations, a scenario of communication between a base station and a terminal, or the like. The technical solutions provided in the embodiments of this application may be applied to a scenario of communication between terminals or a scenario of communication between base stations in the 5G communications system. Single carrier transmission may be uplink single carrier transmission, or may be downlink single carrier transmission.

Figure 1:
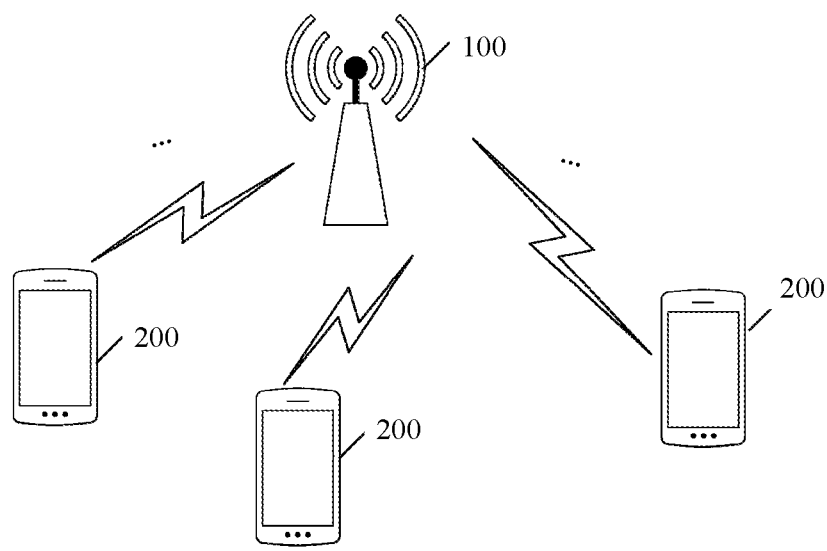
FIG. 1 is a schematic diagram of a communications system to which a technical solution provided in an embodiment of this application is applicable.

FIG. 1 is a schematic diagram of a communications system. The communications system may include at least one base station 100 (only one is shown) and one or more terminals 200 connected to the base station 100.

The base station 100 may be a device that can communicate with the terminal 200. The base station 100 may be a relay station, an access point, or the like. The base station 100 may be a base transceiver station (BTS) in a global system for mobile communications (GSM) or a code division multiple access (CDMA) network, or may be an NB (NodeB) in a wideband code division multiple access (WCDMA) system, or may be an eNB or eNodeB (evolved NodeB) in an LTE system. Alternatively, the base station 100 may be a radio controller in a cloud radio access network (CRAN) scenario. Alternatively, the base station 100 may be a network device in a 5G network or a network device in a future evolved network; or may be a wearable device, an in-vehicle device, or the like. Alternatively, the base station 100 may be a small cell, a transmission/reception point (TRP), or the like. Certainly, this application is not limited thereto.

The terminal 200 may be user equipment (UE), an access terminal, a UE unit, a UE station, a mobile station, a mobile console, a remote station, a remote terminal, a mobile device, a UE terminal, a terminal, a wireless communications device, a UE agent, a UE apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal in a future 5G network, a terminal in a future evolved PLMN network, or the like. Certainly, this application is not limited thereto.

In a communications system, a phase error compensation process is as follows: For each OFDM symbol in one or more OFDM symbols in time domain, a transmit end device inserts a PTRS into a data signal and then sends the data signal after operations such as DFT, resource mapping, and inverse fast Fourier transform (IFFT). After receiving the signal, a receive end device obtains a PTRS (namely, a received PTRS) and a data signal (namely, a received data signal) after operations such as fast Fourier transform (FFT), inverse resource mapping, and inverse discrete Fourier transform (IDFT). A phase error of the PTRS is obtained based on the original PTRS and the received PTRS. Then, a phase error of the data signal is obtained through filtering and/or interpolation, and phase error compensation is performed for the received data signal by using the phase error of the data signal. Finally, a data signal obtained through the phase error compensation is demodulated. The phase error includes a signal phase change caused by phase noise, a carrier offset, Doppler, or the like.

Some terms and related technologies in this specification are explained below to facilitate understanding.

(1) Transmit End Device and Receive End Device

The transmit end device is a device that sends a data signal. Certainly, the transmit end device may further send a reference signal or send another signal. This is not limited in this application.

The receive end device is a device that receives a data signal. Certainly, the receive end device may further receive a reference signal or receive another signal. This is not limited in this application.

In an uplink direction, the transmit end device is a terminal, and the receive end device is a base station. In a downlink direction, the transmit end device is a base station, and the receive end device is a terminal. The reference signal may be, for example, but is not limited to a PTRS.

(2) PTRS and Data Signal

The PTRS is a signal that is known to both the transmit end device and the receive end device. Generally, a PTRS pre-agreed by both the transmit end device and the receive end device is a modulated symbol sequence. A modulation scheme of the PTRS is, for example, but not limited to BPSK, pi/2-BPSK, or quadrature phase shift keying (QPSK). For example, if the modulation scheme is BPSK or pi/2-BPSK, the PTRS is a BPSK symbol sequence, where the BPSK symbol sequence includes one or more BPSK symbols (namely, BPSK modulation symbols). If the modulation scheme is QPSK, the PTRS is a QPSK symbol sequence, where the QPSK symbol sequence includes one or more QPSK symbols (namely, QPSK modulation symbols). To describe technical solutions provided in this application more clearly, terms such as "a BPSK modulated PTRS" and "a pi/2-BPSK modulated PTRS" are used in this specification.

The PTRS may include one or more PTRS blocks (or pilot blocks or PTRS pilot blocks), and each PTRS block includes one or more modulation symbols. In some embodiments of this application, the PTRS is described by using an example in which the BPSK symbol sequence is inserted into the data signal. Therefore, each PTRS block includes one or more BPSK symbols.

The data signal is a signal that is known to the transmit end device and unknown to the receive end device. The data signal may be a bit sequence, or may be a symbol sequence that is obtained by modulating a bit sequence. Whether the data signal specifically indicates a bit sequence or a symbol sequence may be inferred based on an application scenario and a context description. For example, "the data signal" in "modulating the data signal" is a bit sequence. "The data signal" in "inserting the PTRS into the data signal" is a symbol sequence. Other examples are not listed one by one. A modulation scheme of the data signal is, for example, but not limited to BPSK, pi/2-BPSK, QPSK, or 16QAM. For example, if the modulation scheme is BPSK or pi/2-BPSK, the modulated data signal is a BPSK symbol sequence.

An original PTRS is a PTRS that is agreed by both the receive end device and the transmit end device, and is a PTRS that is prestored by both the receive end device and the transmit end device.

A received PTRS may be understood as a PTRS that is obtained after channel transmission of the original PTRS.

A received data signal may be understood as a data signal that is obtained after channel transmission of an original data signal. The original data signal may be understood as a data signal that is sent by the transmit end device.

It should be noted that, because a signal is affected by factors such as noise during the channel transmission, the received PTRS is usually different from the original PTRS, and the received data signal is usually different from the original data signal.

(3) First Sequence and Second Sequence

In some embodiments of this application, a concept of a first sequence is introduced. The first sequence is a sequence that is obtained by inserting a BPSK modulated PTRS into a BPSK modulated data signal.

In some embodiments of this application, a concept of a second sequence is introduced. The second sequence is a sequence that is obtained by inserting a pi/2-BPSK modulated PTRS into a pi/2-BPSK modulated data signal.

Figure 2:
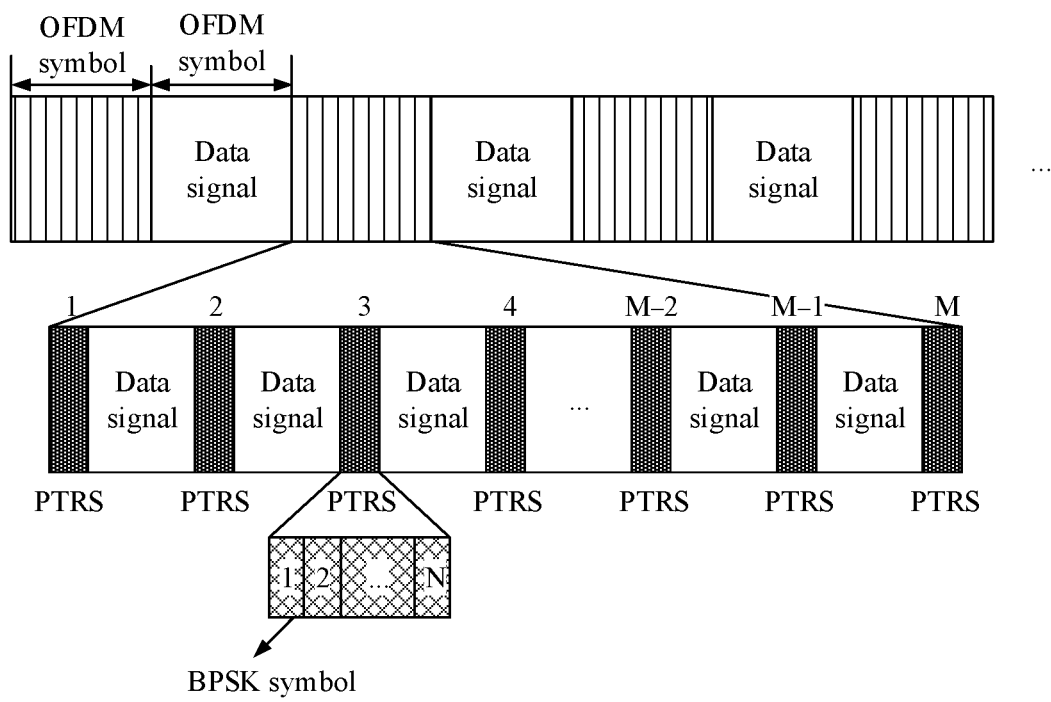
FIG. 2 is a schematic diagram of a data signal and PTRS distribution according to an embodiment of this application.
Figure 3:
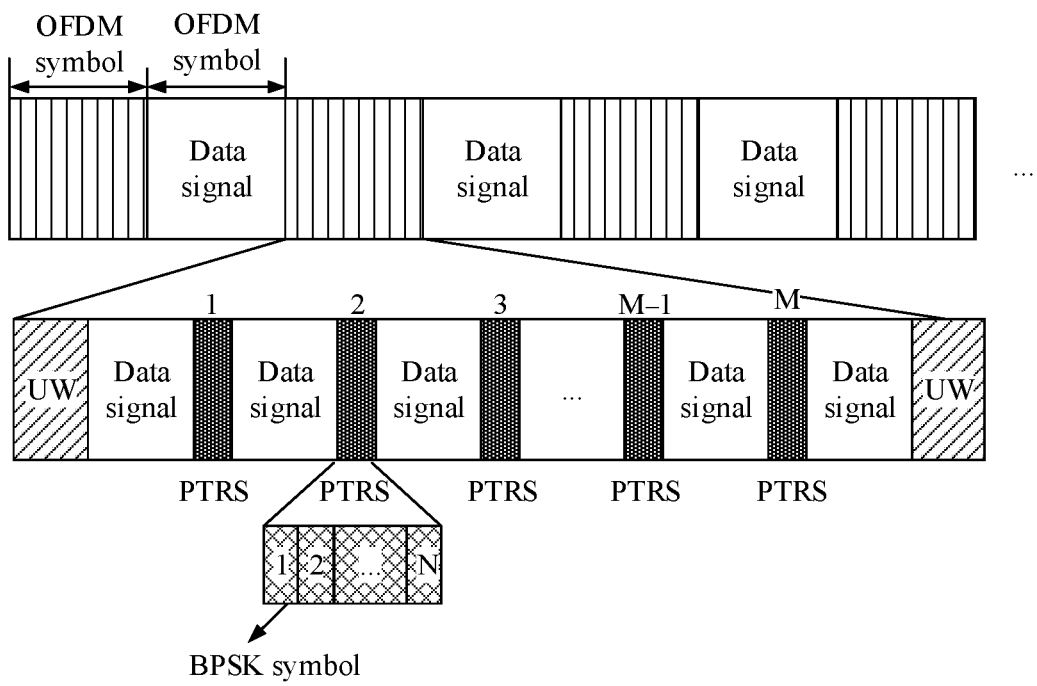
FIG. 3 is a schematic diagram of another data signal and PTRS distribution according to an embodiment of this application.

Distributions of data signals and PTRSs in the first sequence/the second sequence are not limited in this application. FIG. 2 and FIG. 3 are schematic diagrams of data signal and PTRS distributions, respectively.

In FIG. 2 and FIG. 3, two adjacent OFDM symbols on which PTRSs are mapped are separated by one OFDM symbol on which no PTRS is mapped. Certainly, this application is not limited thereto. On the OFDM symbol on which a PTRS is mapped, one PTRS block is inserted every several BPSK symbols of a data signal, where BPSK symbols (namely, BPSK symbols of the PTRS) included in any two PTRS blocks may be the same or different in quantity, and BPSK symbols (namely, BPSK symbols of the data signal) between any two adjacent PTRS blocks may be the same or different in quantity. In FIG. 2 and FIG. 3, a sequence including a PTRS and a data signal in each OFDM symbol on which a PTRS is mapped is a first sequence/second sequence.

A difference between FIG. 2 and FIG. 3 lies in that, in FIG. 3, UWs are further mapped, for channel estimation, at both ends of the OFDM symbol on which the PTRS is mapped. It should be noted that, FIG. 2 and FIG. 3 may be used in combination. For example, for signal distributions on some OFDM symbols on which PTRSs are mapped, refer to FIG. 2. For signal distributions on the other OFDM symbols on which the PTRSs are mapped, refer to FIG. 3. In addition, both FIG. 2 and FIG. 3 are described by using an example in which M PTRS blocks are inserted between data signals and each PTRS block includes N BPSK symbols, where both M and N are integers greater than or equal to 1.

(4) Pi/2 (Namely, $\pi/2$) BPSK

To achieve a low PAPR, a modulation scheme of a data signal may be pi/2-BPSK. A process of performing pi/2-BPSK on the data signal may include: modulating the data signal by using BPSK, and then phase-shifting a BPSK symbol in a BPSK modulated data signal according to a pi/2 progressive increase or decrease rule.

Figure 4:
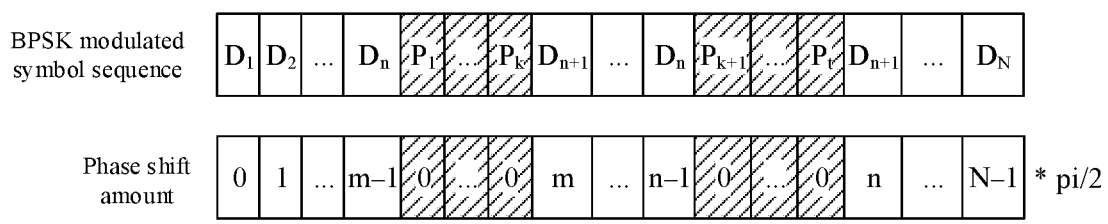
FIG. 4 is a schematic diagram of a phase shift amount according to the prior art.

When a modulation scheme of a PTRS is BPSK, a BPSK modulated PTRS is inserted into a BPSK modulated data signal, to obtain a first sequence, as shown in the top part of FIG. 4. The PTRS is not phase-shifted in the prior art. Therefore, when a phase shifting operation is performed, phase shift amounts of BPSK symbols in the first sequence are shown in the bottom part of FIG. 4. Each small box in FIG. 4 represents a BPSK symbol. As shown in the top part of FIG. 4, $D_1, D_2, \ldots, D_m, D_{m+1}, \ldots, D_n, D_{n+1}, \ldots, D_N$ are BPSK symbols in the BPSK modulated data signal, and $P_1, P_2, \ldots, P_k, P_{k+1}, \ldots, P_t$ are BPSK symbols in the BPSK modulated PTRS, where $1 \leq m < n \leq N$, $1 \leq k < t$, and m, n, N, k and t are all integers. A number in each small box in the bottom part of FIG. 4 represents a phase shift coefficient of a BPSK symbol over the small box. The phase shift amount of the BPSK symbol is a product of the phase shift coefficient of the BPSK symbol and pi/2. For example, 1 in the second small box in (b) of FIG. 4 represents that the phase shift coefficient of $D_2$ is 1, and the phase shift amount is 1*pi/2=pi/2.

Figure 5:
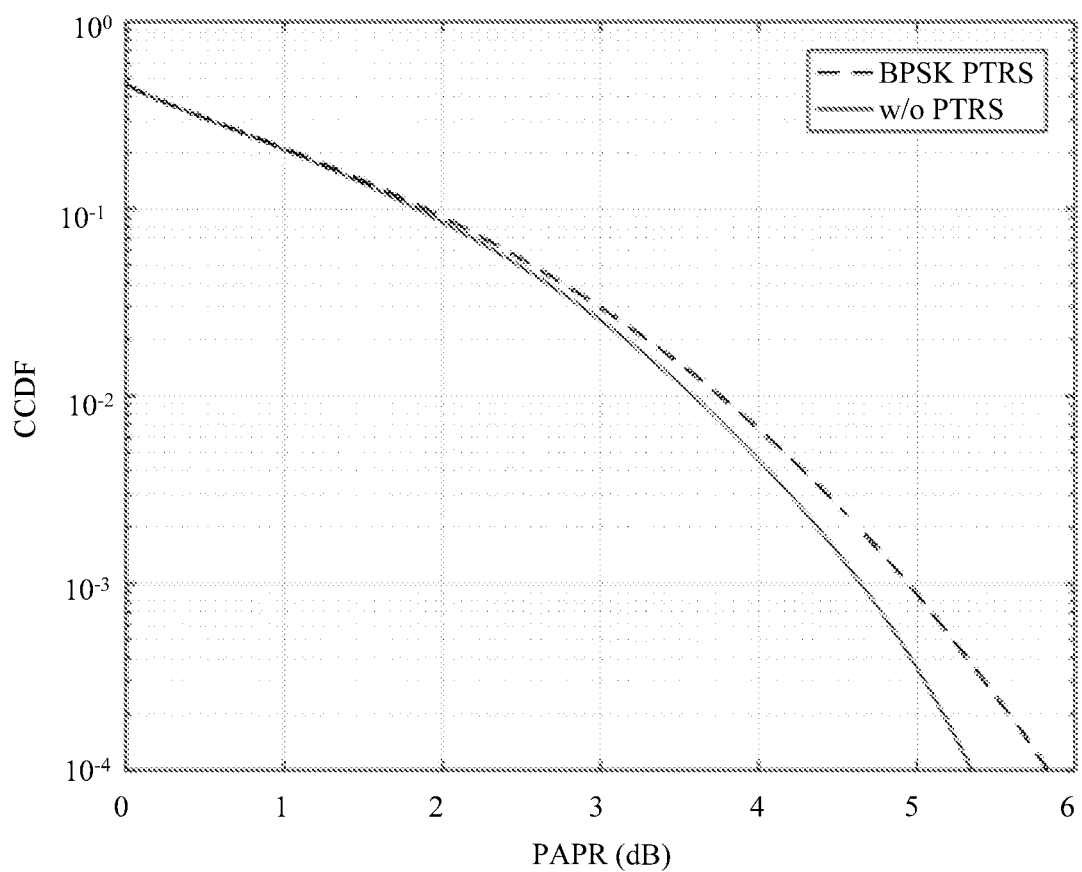
FIG. 5 is a schematic diagram of PAPR simulation comparison in different technical solutions according to the prior art.

The sequence obtained in the bottom part of FIG. 4 may be considered as a sequence that is obtained by inserting the BPSK modulated PTRS into a pi/2-BPSK modulated data signal. It can be learned from the bottom part of FIG. 4 that this may destroy a pi/2 characteristic of the data signal and a low-PAPR characteristic of pi/2-BPSK, resulting in an increase in the PAPR of a communications system. In addition, a larger PTRS block has greater impact on the PAPR of the communications system. When a modulation scheme of data signal is pi/2-BPSK, FIG. 5 is a schematic diagram of PAPR simulation of a communications system when a BPSK modulated PTRS is inserted into a data signal and when no PTRS is inserted into a data signal. In FIG. 5, a horizontal coordinate axis represents a PAPR in a unit of dB, and a vertical coordinate axis represents a complementary cumulative distribution function (CCDF), where the CCDF represents a probability that a statistical amount is greater than a corresponding point on the horizontal coordinate axis. For example, when the PAPR in the horizontal coordinate axis is 3, the CCDF in the vertical coordinate axis is approximately 0.03, indicating that a probability of PAPR>3 dB is 0.03. It can be learned from FIG. 5 that, the PAPR of the communications system is 0.5 dB (decibel) more when a BPSK modulated PTRS is inserted between the data signals (refer to the dashed line in FIG. 5) than when no PTRS is inserted (refer to the solid line in FIG. 5).

It should be noted that, in the prior art, a modulation mode of a PTRS is usually QPSK, and in this case, an example of inserting a QPSK-modulated PTRS between BPSK modulated data signals may be obtained based on FIG. 4. Details are not described herein again.

(6) Other Terms

The term "a plurality of" in this specification indicates two or more than two.

The terms "first", "second", and the like are used only to distinguish between different objects, and do not limit their order. For example, a first sequence and a second sequence are used only to distinguish between different sequences, and do not limit their order.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between a former associated object and a latter associated object, and in a formula, the character "/" represents a "division" relationship between a former associated object and a latter associated object.

A technical solution provided in this application is described below from the perspective of an information transmission method. It should be noted that, a process of processing a signal on an OFDM symbol on which a PTRS is mapped is used below as an example for description.

Figure 6:
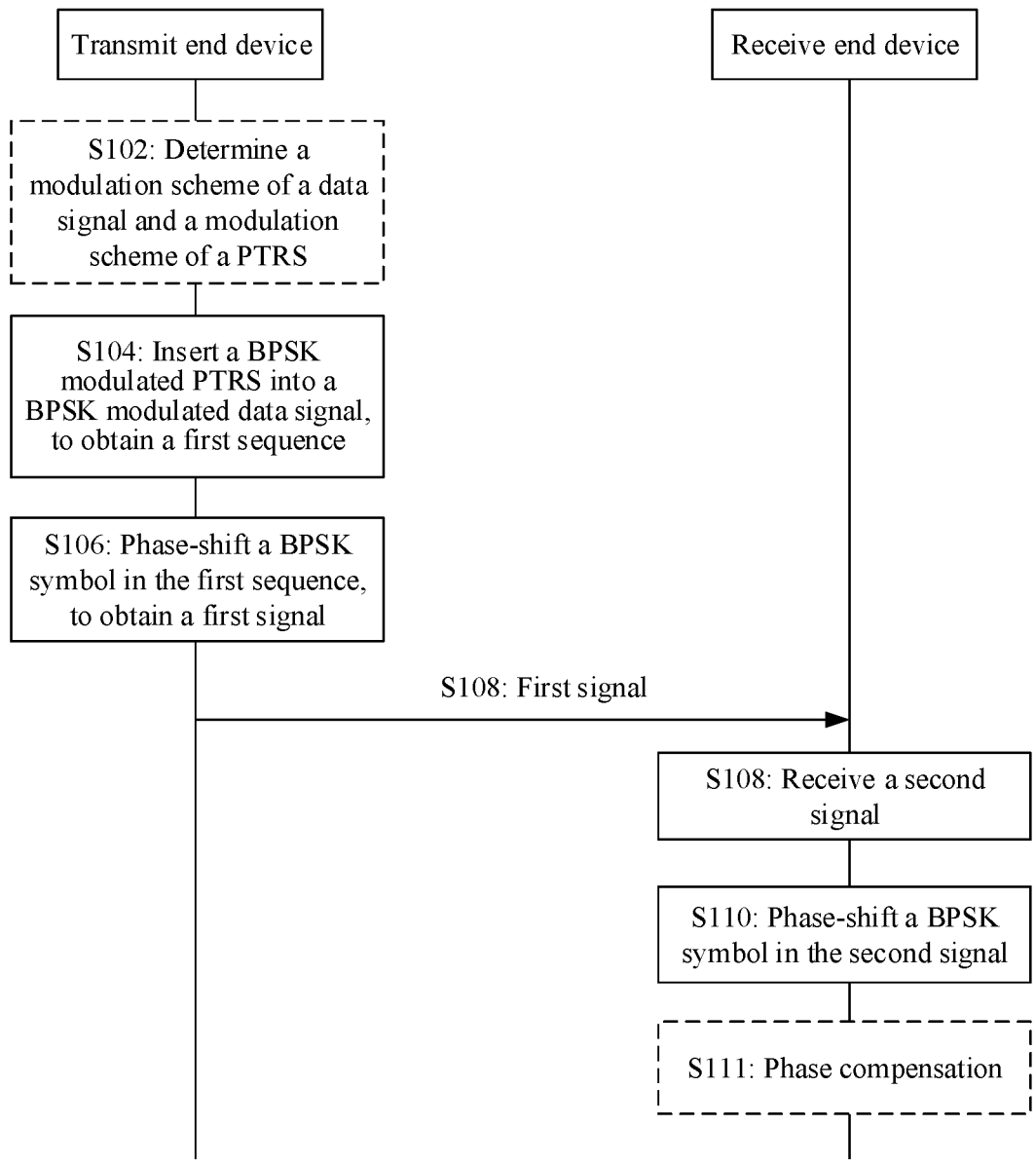
FIG. 6 is a schematic diagram of an information transmission method according to an embodiment of this application.

FIG. 6 is a schematic diagram of an information transmission method according to this application. In this embodiment, an information transmission process in a scenario in which a transmit end device first performs an insertion step and then performs a phase-shifting step is mainly described, which specifically includes the following steps.

S102: The transmit end device determines a modulation scheme of a data signal and a modulation scheme of a preset PTRS.

In an uplink single carrier transmission scenario, the transmit end device is a terminal. The terminal may determine the modulation scheme of the data signal based on a received MCS sent by a base station and a prestored mapping relationship between an MCS and a modulation scheme. In a downlink single carrier transmission scenario, the transmit end device is a base station. The base station may determine an MCS based on current channel quality, and determine the modulation scheme of the data signal based on the prestored mapping relationship between an MCS and a modulation scheme. In some embodiments of this application, when the MCS is greater than or equal to 0 and less than or equal to a preset value, it is determined that the modulation scheme of the data signal is pi/2-BPSK, where the preset value is 4, 6, or 8. The MCS is an integer greater than or equal to 0.

S104: If the modulation scheme of the data signal is pi/2-BPSK, and the modulation scheme of the preset PTRS is BPSK, the transmit end device first performs BPSK modulation on the data signal, and inserts a BPSK modulated PTRS into a BPSK modulated data signal, to obtain a first sequence; and then, performs S106.

This application resolves a problem that a PAPR of a communications system increases due to insertion of the BPSK modulated PTRS when the modulation scheme of the data signal is pi/2-BPSK. Therefore, in an exemplary embodiment, if the modulation scheme of the data signal is pi/2-BPSK, the technical solution provided in this application is performed. If the modulation scheme of the data signal is not pi/2-BPSK, a technical solution provided in the prior art may be performed. This application is not limited to this scenario.

After S102, if both the modulation scheme of the data signal and the modulation scheme of the preset PTRS are pi/2-BPSK, the transmit end device may first perform pi/2-BPSK modulation on the data signal, and insert a pi/2-BPSK modulated PTRS into a pi/2-BPSK modulated data signal, to obtain a first sequence; and then, perform S108.

S106: The transmit end device phase-shifts BPSK symbols in the first sequence, to obtain a first signal.

The PTRS includes one or more PTRS blocks, and each PTRS block includes one or more BPSK symbols. Phase-shifting the PTRS may include phase-shifting the BPSK symbol in each PTRS block according to a pi/2 progressive increase or decrease rule. This application does not limit a phase-shifting rule of the BPSK symbols in the PTRS blocks. To reduce computational complexity of both a transmit end device and a receive end device, optionally, step S106 is implemented in, for example, but not limited to, Manner 1 or Manner 2 below.

Manner 1: The transmit end device phase-shifts the BPSK symbols in the first sequence based on an arrangement order of the BPSK symbols in the first sequence according to a pi/2 progressive increase rule, to obtain the first signal. Alternatively, the transmit end device phase-shifts the BPSK symbols in the first sequence based on an arrangement order of the BPSK symbols in the first sequence according to a pi/2 progressive decrease rule, to obtain the first signal.

Figure 7:
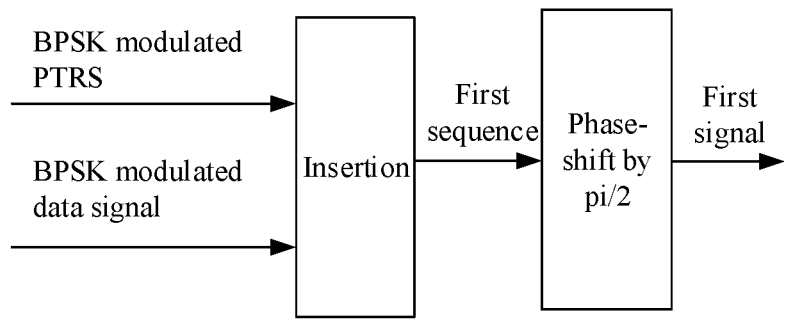
FIG. 7 is a schematic diagram of an information transmission process according to an embodiment of this application.

Manner 1 may be considered as phase-shifting the data signal and the PTRS as a whole by the transmit end device. When S106 is implemented in Manner 1, an implementation process of this embodiment is shown in FIG. 7. In this manner, because the data signal and the PTRS are phase-shifted as a whole, both a phase shift amount of the data signal and a phase shift amount of the PTRS are related to a relative location between the data signal and the PTRS in the first sequence. It may also be understood that, a phase shift amount of each BPSK symbol in the first sequence is related to a location of the BPSK symbol in the first sequence.

Figure 8:
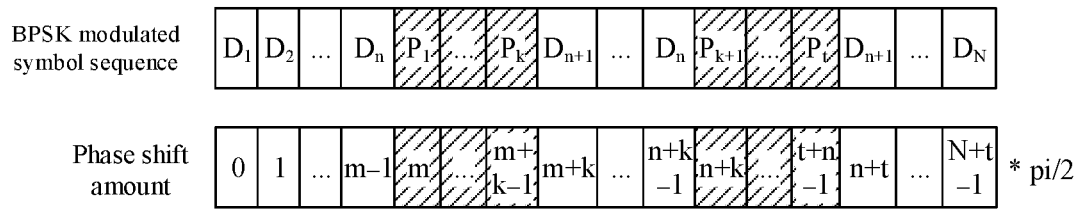
FIG. 8 is a schematic diagram of another phase shift amount according to an embodiment of this application.

FIG. 8 is a schematic diagram of phase shift amounts of BPSK symbols in a BPSK modulated symbol sequence (namely, the first sequence in Manner 1). For explanations of related content in the top and bottom parts of FIG. 8, refer to the foregoing explanations of the related content in FIG. 4. It should be noted that, the bottom part of FIG. 8 represents phase shift amounts by which the BPSK symbols in the BPSK modulated symbol sequence are phase-shifted according to a pi/2 progressive increase rule. In an implementation, the phase shift amount may be represented as mod((pi/2)*k, 2pi). In this case, if m=3, a phase shift amount of Pi is (pi/2)*3=3pi/2, and the transmit end device phase-shifts Pi, to obtain $P_1*exp(1j*3pi/2)=-j*P_1$. If n=8 and k=2, a phase shift amount of $P_{k+1}$ is mod(pi/2*(8+2), 2pi)=pi, and the transmit end device phase-shifts $P_{k+1}$, to obtain $P_{k+1}*exp(1j*pi)=-P_{k+1}$. Other examples are not listed one by one.

It may be understood that, if the transmit end device phase-shifts the BPSK symbols in the first sequence according to a pi/2 progressive decrease rule, an example obtained by changing pi/2 in (b) of FIG. 8 to –pi/2 is an example of the BPSK symbols in the BPSK modulated symbol sequence.

In Manner 1, the transmit end device phase-shifts the data signal and the PTRS as a whole. In other words, it may be considered that the PTRS is used as a part of the data signal, and then pi/2-BPSK modulation is performed on the data signal. Therefore, a PAPR of a communications system in this manner is the same as a PAPR of the communications system when no PTRS is inserted into the data signal.

Manner 2: The transmit end device phase-shifts the BPSK symbols in the PTRS based on an arrangement order of the BPSK symbols in the PTRS according to a pi/2 progressive increase or decrease rule; and phase-shifts the BPSK symbols in the BPSK modulated data signal according to a pi/2 progressive increase or decrease rule, to obtain the first signal.

Figure 9:
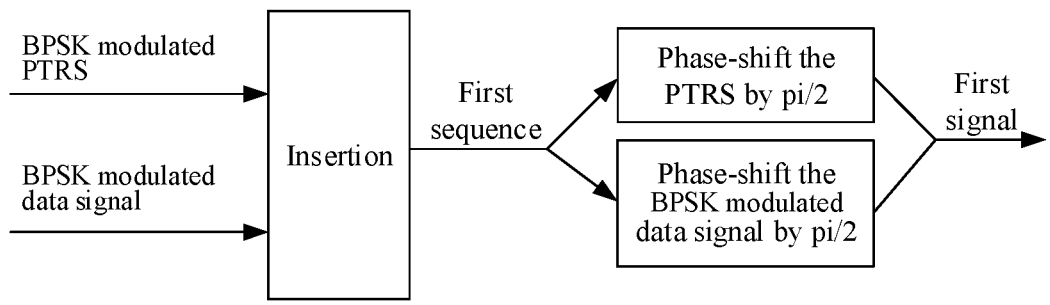
FIG. 9 is a schematic diagram of another information transmission process according to an embodiment of this application.

Manner 2 may be considered as phase-shifting the data signal and the PTRS independently by the transmit end device. This application does not limit an execution order in which the transmit end device phase-shifts the PTRS and phase-shifts the data signal. When S106 is implemented in Manner 2, an implementation process of this embodiment is shown in FIG. 9.

Several implementations of this manner are shown in Table 1.

TABLE 1

| Implementation | Phase-shifting rule of a data signal | Phase-shifting rule of a PTRS |
| --- | --- | --- |
| Implementation 1 | Pi/2 progressive increase | Pi/2 progressive increase |
| Implementation 2 | Pi/2 progressive increase | Pi/2 progressive decrease |
| Implementation 3 | Pi/2 progressive decrease | Pi/2 progressive increase |
| Implementation 4 | Pi/2 progressive decrease | Pi/2 progressive decrease |

Description of Implementation 1 in Table 1: The transmit end device phase-shifts the PTRS based on an order of the BPSK symbols in the PTRS according to a pi/2 progressive increase rule, and phase-shifts the data signal based on an order of the BPSK symbols in the data signal according to the pi/2 progressive increase rule. Explanations of other implementations are not listed one by one.

In Manner 2, phase shift amounts of the BPSK symbols in the PTRS are unrelated to a relative location between the PTRS and the data signal, but are related to a relative location between the BPSK symbols in the PTRS. A phase shift amount of the data signal is unrelated to the relative location between the PTRS and the data signal, but is related to a relative location between the BPSK symbols in the data signal.

Figure 10:
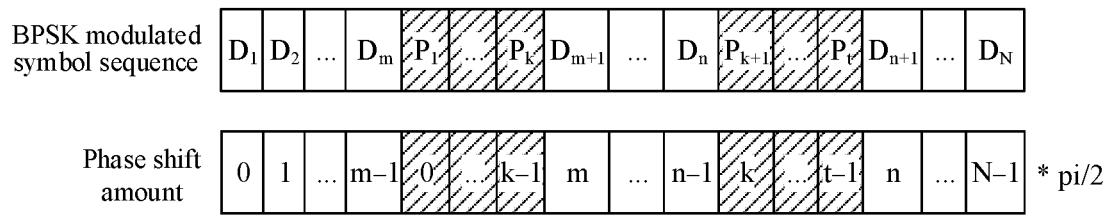
FIG. 10 is a schematic diagram of another phase shift amount according to an embodiment of this application.

FIG. 10 is a schematic diagram of the phase shift amounts of the BPSK symbols in the BPSK modulated symbol sequence in this manner. For explanations of related content in the top and bottom parts of FIG. 10, refer to the foregoing explanations of the related content in FIG. 4 or FIG. 8. It should be noted that, the bottom part of FIG. 10 is an example description of phase shift amounts by which the data signal and the PTRS are independently phase-shifted according to a pi/2 progressive increase rule (namely, Implementation 1 in Table 1). In FIG. 10, a phase shift amount of $P_1$ is 0; when k=2, a phase shift amount of $P_k$ is pi/2, and a phase shift amount of $P_{k+1}$ is pi. Other examples are not listed one by one.

Compared with Manner 1, Manner 2 has lower complexity because both the phase shift amount of the data signal and the phase shift amount of the PTRS are unrelated to the relative location between the PTRS and the data signal.

It may be understood that, as can be learned from FIG. 8 and FIG. 10, if the phase shift amount is mod(pi/2*k, 2pi), when a quantity of the BPSK symbols in the PTRS block and a quantity of the BPSK symbols in the data signal between the PTRS blocks are integer multiples of 4, the technical solution provided in FIG. 8 is equivalent to the technical solution provided in FIG. 10. In addition, if the phase shift amount is mod(pi/2*k, pi), when a quantity of the BPSK symbols in the PTRS block and a quantity of the BPSK symbols in the data signal between the PTRS blocks are integer multiples of 2, technical solutions in two phase-shifting directions (namely, a pi/2 progressive increase and a pi/2 progressive decrease) are equivalent. For example, Implementations 1 to 4 described above are equivalent.

Figure 11:
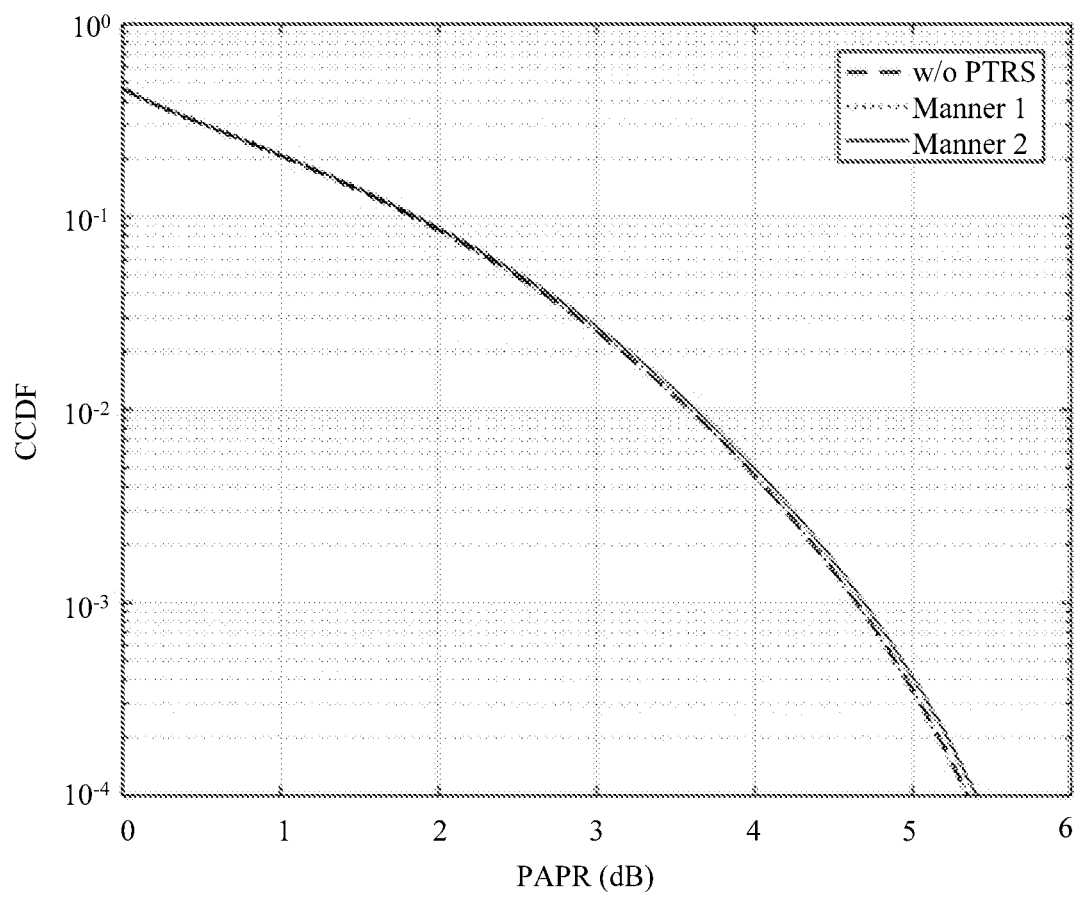
FIG. 11 is a schematic diagram of PAPR simulation comparison in different technical solutions according to an embodiment of this application.

FIG. 11 is a schematic diagram of PAPR simulation comparison in different technical solutions. A horizontal coordinate axis represents a PAPR in a unit of dB, and a vertical coordinate axis represents a CCDF. FIG. 11 is a schematic diagram of PAPR simulation comparison in a technical solution in which no PTRS is inserted into a data signal (refer to the dashed line corresponding to w/o PTRS in FIG. 11) and a technical solution in which phase shifting is performed in Manner 1 or Manner 2. It should be noted that, in FIG. 11, the dashed line indicating that no PTRS is inserted into a data signal overlaps the dotted line indicating Manner 1, forming the dash-dotted line in FIG. 11.

S108: The transmit end device sends the first signal after performing operations such as DFT, resource mapping, and IFFT on the first signal. A receive end device receives the signal, and after performing operations such as FFT, inverse resource mapping, and IDFT on the signal, obtains a second signal. The second signal may be understood as a signal obtained after channel transmission of the first signal. The second signal includes a pi/2-BPSK modulated data signal and a pi/2-BPSK modulated PTRS.

S110: The receive end device phase-shifts BPSK symbols in the second signal. After S110 is performed, an obtained data signal is a received data signal, and an obtained PTRS is a received PTRS.

In an uplink single carrier transmission scenario, the receive end device is a base station. In a downlink single carrier transmission scenario, the receive end device is a terminal. The terminal may determine a modulation scheme of the data signal based on a received MCS sent by a base station and a prestored mapping relationship between an MCS and a modulation scheme.

If the transmit end device phase-shifts the first sequence in Manner 1 in S106, the receive end device phase-shifts the second signal in an opposite direction in Manner 1 in S110. Specifically, if the transmit end device phase-shifts the BPSK symbols in the first sequence based on an order of the BPSK symbols in the first sequence according to a pi/2 progressive increase rule, the receive end device phase-shifts the BPSK symbols in the second signal based on an order of the BPSK symbols in the second signal according to a pi/2 progressive decrease rule. If the transmit end device phase-shifts the BPSK symbols in the first sequence based on an order of the BPSK symbols in the first sequence according to a pi/2 progressive decrease rule, the receive end device phase-shifts the BPSK symbols in the second signal based on an order of the BPSK symbols in the second signal according to a pi/2 progressive increase rule. In other words, if the transmit end device phase-shifts a BPSK symbol in the first sequence by theta, the receive end device phase-shifts a corresponding BPSK symbol in the second signal by −theta.

If the transmit end device phase-shifts the first sequence in Manner 2 in S106, the receive end device phase-shifts the second signal in an opposite direction in Manner 2 in S110. Specifically, if the transmit end device performs phase-shifting according to Implementation i in Table 1, the receive end device performs phase-shifting according to Implementation is in Table 2, where 1<i<4, and i is an integer. For example, if the transmit end device performs phase-shifting according to Implementation 1 in Table 1, the receive end device may phase-shift according to Implementation 1a in Table 2.

TABLE 2

| Implementation | Phase-shifting rule of a data signal | Phase-shifting rule of a PTRS |
| --- | --- | --- |
| Implementation 1a | Pi/2 progressive decrease | Pi/2 progressive decrease |
| Implementation 2a | Pi/2 progressive decrease | Pi/2 progressive increase |
| Implementation 3a | Pi/2 progressive increase | Pi/2 progressive decrease |
| Implementation 4a | Pi/2 progressive increase | Pi/2 progressive increase |

It may be understood that, an implementation (including either of Manner 1 and Manner 2) in which the transmit end device phase-shifts the first sequence may be pre-agreed by both the transmit end device and the receive end device according to a protocol, or may be notified to a peer end through signaling. Therefore, the receive end device may learn of an implementation to be used to phase-shift the second signal.

Optionally, after S110, the method may further include the following steps:

S111: The receive end device obtains a phase error of the PTRS based on the original PTRS and the received PTRS; obtains a phase error of the data signal through operations such as filtering and/or interpolation and performs phase error compensation for the received data signal by using the phase error of the data signal; and finally demodulates the data signal obtained through the phase error compensation. This step may be understood as a specific implementation in which the receive end device demodulates the pi/2-BPSK modulated data signal based on a pi/2-BPSK modulated PTRS in a received OFDM symbol.

It may be understood that, the first signal and the second signal may be understood as an OFDM signal, and the OFDM signal may include one or more OFDM symbols.

In the information transmission method provided in this embodiment of this application, the OFDM symbol sent by the transmit end device includes the pi/2-BPSK modulated data signal and the pi/2-BPSK modulated PTRS, increasing randomness of the PTRS compared with the prior art in which the OFDM symbol includes a QPSK-modulated PTRS. As randomness increases, system performance becomes more stable, so that a low-PAPR characteristic of a single carrier is well utilized.

Figure 12:
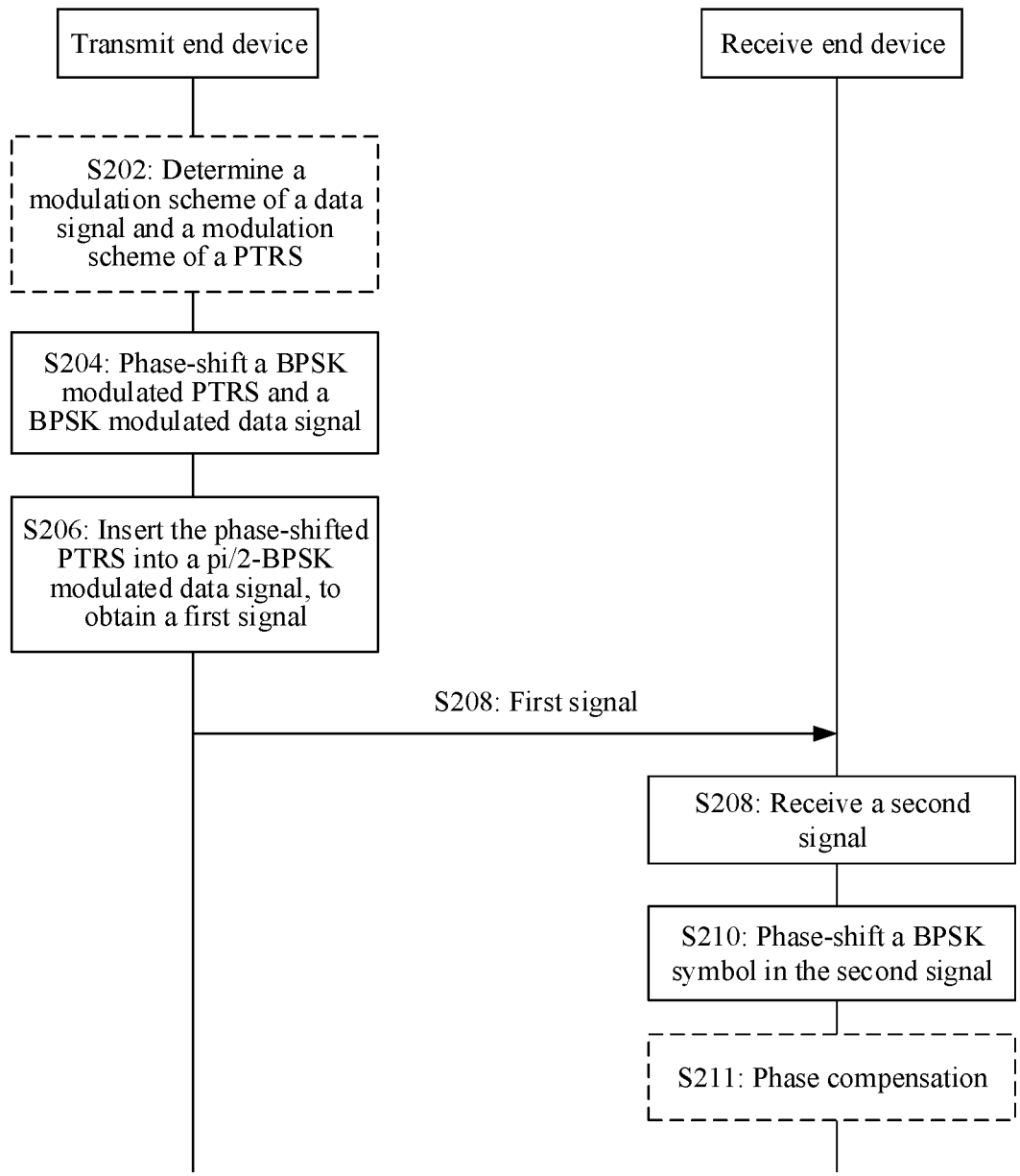
FIG. 12 is a schematic diagram of another information transmission method according to an embodiment of this application.

FIG. 12 is a schematic diagram of another information transmission method according to this application. In this embodiment, an information transmission process in a scenario in which a transmit end device first performs a phase-shifting step and then performs an insertion step is mainly described, which specifically includes the following steps.

S202: Refer to S102. Certainly, this application is not limited thereto.

S204: If a modulation scheme of a data signal is pi/2-BPSK, and a modulation scheme of a preset PTRS is BPSK, the transmit end device phase-shifts a BPSK modulated PTRS and a BPSK modulated data signal.

S206: The transmit end device inserts a phase-shifted PTRS (namely, a pi/2-BPSK modulated PTRS) into a pi/2-BPSK modulated data signal, to obtain a second sequence (namely, a first signal).

The step S204 is implemented in, for example, but not limited to, Manner 3 or Manner 4.

Manner 3: The transmit end device phase-shifts BPSK symbols in the first signal based on an arrangement order of the BPSK symbols in the first signal according to a pi/2 progressive increase rule. Alternatively, the transmit end device phase-shifts BPSK symbols in the first signal based on an arrangement order of the BPSK symbols in the first signal according to a pi/2 progressive decrease rule.

Figure 13:
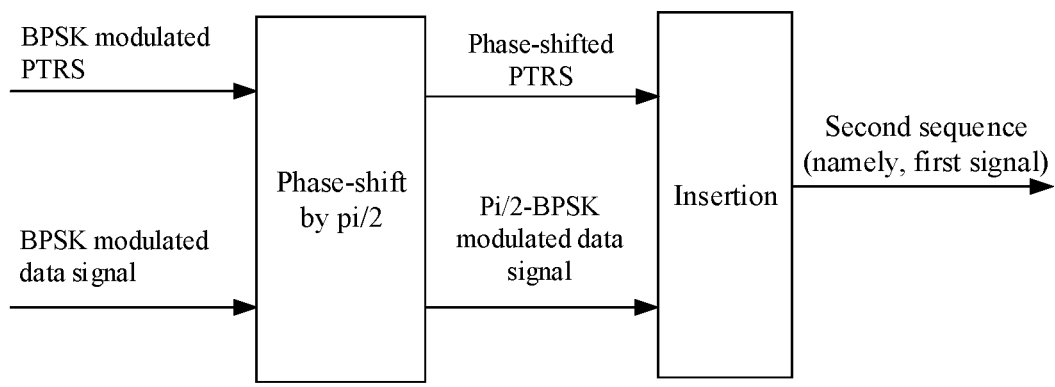
FIG. 13 is a schematic diagram of another information transmission process according to an embodiment of this application.

Manner 3 may be considered as phase-shifting the data signal and the PTRS as a whole by the transmit end device. When S204 is implemented in Manner 3, an implementation process of this embodiment is shown in FIG. 13. For explanations of related content in this manner, refer to the foregoing description. In addition, in this case, for a schematic diagram of phase shift amounts of the BPSK symbols in the first signal, refer to FIG. 8. Details are not described herein again.

It should be noted that, before performing the insertion, the transmit end device can learn of an insertion location of each PTRS block in a BPSK sequence of the data signal. Therefore, before the insertion is performed, the data signal and the PTRS may be phase-shifted as a whole.

Manner 4: The transmit end device phase-shifts BPSK symbols in the PTRS based on an arrangement order of the BPSK symbols in the PTRS according to a pi/2 progressive increase or decrease rule; and phase-shifts BPSK symbols in the BPSK modulated data signal according to a pi/2 progressive increase or decrease rule, to obtain the first signal (namely, the second sequence).

Figure 14:
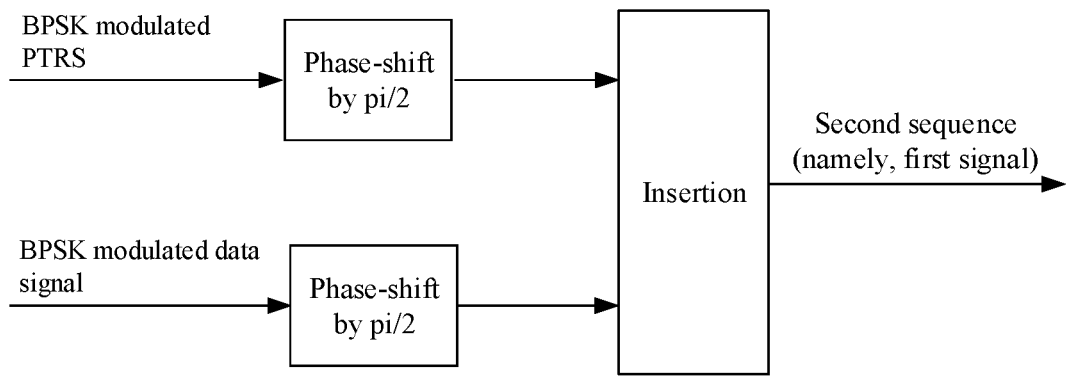
FIG. 14 is a schematic diagram of another information transmission process according to an embodiment of this application.

Manner 4 may be considered as phase-shifting the data signal and the PTRS independently by the transmit end device. When S204 is implemented in Manner 4, an implementation process of this embodiment is shown in FIG. 14. For explanations of related content in this manner, refer to the foregoing description. In addition, in this case, for a schematic diagram of phase shift amounts of BPSK symbols in the first signal, refer to FIG. 10. Details are not described herein again.

S208 to S210: Refer to S108 to S110. Certainly, this application is not limited thereto.

Optionally, the method may further include S211. For S211, refer to S111. Certainly, this application is not limited thereto.

In addition to pi/2-BPSK, the modulation scheme of the data signal may be QPSK, 16 QAM, or the like. In addition to BPSK or pi/2-BPSK, the modulation scheme of the preset PTRS may be QPSK or the like.

In some embodiments of this application, the modulation scheme of the preset PTRS is BPSK. In this case, if the transmit end device determines that the modulation scheme of the data signal is pi/2-BPSK, the transmit end device phase-shifts the BPSK modulated PTRS, to obtain the pi/2-BPSK modulated PTRS. For a specific implementation process, refer to the foregoing description. If it is determined that the modulation scheme of the data signal is not pi/2-BPSK, the BPSK modulated PTRS is not phase-shifted. A receive end device performs steps corresponding to the steps performed by the transmit end device, and details are not redundantly repeated herein. In this case, actually, an example of a correspondence between the modulation scheme of the data signal and the modulation scheme of the PTRS is shown in Table 3.

TABLE 3

| Modulation scheme of a data signal | Modulation scheme of a PTRS |
| --- | --- |
| Pi/2 BPSK | Pi/2 BPSK |
| BPSK | BPSK |
| QPSK | BPSK |
| 16QAM | BPSK |

In some embodiments of this application, the modulation scheme of the preset PTRS is QPSK. In this case, if the transmit end device determines that the modulation scheme of the data signal is pi/2-BPSK, the modulation scheme of the PTRS is changed from QPSK to pi/2-BPSK. Then a QPSK symbol sequence of the PTRS is demodulated to obtain a bit sequence of the PTRS, a part of the bit sequence is taken from the bit sequence of the PTRS to form a new PTRS bit sequence, and pi/2-BPSK modulation is performed on the new PTRS bit sequence. For a pi/2-BPSK modulation process, refer to the foregoing description. In addition, the part to be taken from the PTRS bit sequence may be pre-agreed by both the receive end device and the transmit end device, or may be configured through signaling, and this is not limited in this application. If the transmit end device determines that the modulation scheme of the data signal is not pi/2-BPSK, processing is performed in a manner in the prior art. Correspondingly, the receive end device performs steps corresponding to the steps performed by the transmit end device, and details are not redundantly repeated herein. In this case, actually, an example of a correspondence between the modulation scheme of the data signal and the modulation scheme of the PTRS is shown in Table 4.

TABLE 4

| Modulation scheme of a data signal | Modulation scheme of a PTRS |
| --- | --- |
| Pi/2 BPSK | Pi/2 BPSK |
| BPSK | QPSK |
| QPSK | QPSK |
| 16QAM | QPSK |

The following describes another embodiment of the present application. This embodiment includes an information transmission method.

A transmit end generates an orthogonal frequency division multiplexing OFDM symbol, where the OFDM symbol includes a π/2 pi/2-binary phase shift keying BPSK modulated phase tracking reference signal PTRS; and the transmit end sends the OFDM symbol. In an embodiment, the method may further include: phase-shifting a BPSK modulated PTRS, to obtain the pi/2-BPSK modulated PTRS, where the PTRS includes one or more PTRS blocks, each PTRS block includes one or more BPSK symbols, and the BPSK symbol in each PTRS block is phase-shifted according to a pi/2 progressive increase rule. In an embodiment, that the BPSK symbol in each PTRS block is phase-shifted according to a pi/2 progressive increase rule includes: phase-shifting the PTRS based on a location of a PTRS symbol in the OFDM symbol; or phase-shifting the PTRS based on a location of a PTRS symbol in a PTRS sequence. Optionally, the transmit end may further perform power boosting on the PTRS symbol, and the transmit end may determine a power boosting value based on a modulation scheme of a data signal in the OFDM symbol. The transmit end may further determine the modulation scheme of the data signal based on a modulation and coding scheme MCS. In another embodiment, the OFDM symbol is a discrete Fourier transform spread DFT-s-OFDM symbol. The transmit end may include a processing unit, configured to generate the orthogonal frequency division multiplexing OFDM symbol, and the transmit end further includes a sending unit, configured to send the OFDM symbol. In another embodiment, the transmit end may include a processor and a transmitter, configured to generate the OFDM symbol and send the OFDM symbol, respectively. In another embodiment, a transmit end may be a chip or a chip system.

In other embodiments, to reduce impact of a PTRS sequence on a protocol, alternatively, a base station and/or a network device may directly predefine the PTRS sequence as pi/2-BPSK. This step may also be a signaling notification or another configuration manner. The definition manner may be used in all modulation scheme scenarios. A phase shift value of a PTRS may be unrelated to a location of the PTRS before DFT, or may be related to a location of the PRTS before DFT. In an embodiment, a network side device or a terminal device or both increase or decrease a phase of a BPSK sequence by the phase, or multiply the BPSK sequence by an exponential signal corresponding to the phase shift value, for example, exp(1j*phase shift value), to determine the pi/2-BPSK PTRS sequence.

(1) The phase shift value is unrelated to the location of the PTRS in a modulation symbol before DFT: A phase shift value of an $i^{th}$ PTRS may be $\Delta\theta+(i-1)*pi/2$, or $\Delta\theta+i*pi/2$, or $\Delta\theta+(i+1)*pi/2$, where $\Delta\theta$ is an initial phase shift value of the PTRS and may be 0 by default. The phase shift value of the $i^{th}$ PTRS may also be obtained by using another method. For example, phase-shifting in each PTRS block is independent, or an initial phase shift value of each PTRS block is independent. For details, refer to the foregoing description.

(2) The phase shift value is related to the location of the PTRS in a modulation symbol before DFT: The location of the PTRS in the modulation symbol/signal before DFT may be first determined. For example, a total quantity of modulation symbols/signals before DFT is $N_{sym}$, and the modulation symbols/signals are numbered $0, 1, \ldots, N_{sym}-1$. If locations of PTRSs before DFT are a set $S_{PTRS}=\{I_{PTRS-1}, I_{PTRS-2}, \ldots\}$, a phase shift value is $\Delta\theta+I_{PTRS-i}*pi/2$, or a phase shift value is $\Delta\theta+(I_{PTRS-i}-1)*pi/2$, or a phase shift value is $\Delta\theta+(I_{PTRS-i}+1)*pi/2$, where $\Delta\theta$ includes initial phase shift values of all modulation symbols of data before DFT and may be 0 by default.

After the terminal device or the network device or both determine the phase shift value, for a specific phase-shifting process, refer to the foregoing description.

In other embodiments of this application, a PTRS sequence is selected based on a modulation scheme. For example, if a modulation scheme of data or a physical uplink shared channel (physical uplink sharing channel, PUSCH) is pi/2-BPSK, a corresponding PTRS sequence is pi/2-BPSK. If the modulation scheme of the data or the PUSCH is not pi/2-BPSK, a corresponding PTRS sequence is QPSK. Then, phase rotation or shifting is further performed on a QPSK-modulated PTRS, to reduce a PAPR. For example, the terminal device or the network device or both perform pi/2 phase-shifting based on a QPSK modulated symbol, to determine a pi/2 QPSK sequence, or perform pi/4 phase-shifting based on a QPSK modulated symbol, to determine a pi/4 QPSK sequence.

In an embodiment, the terminal device or the network device or both determine a configuration of the pi/2 QPSK sequence corresponding to the pi/2 phase-shifting. In another embodiment, the terminal device or the network device or both may alternatively determine a configuration of the pi/4 QPSK sequence corresponding to the pi/4 phase-shifting.

For determining of a specific phase shift value, refer to the foregoing description.

In an embodiment, if the modulation scheme of the data or the PUSCH is not QPSK, a corresponding PTRS sequence may be a clockwise moved/rotated or counter-clockwise moved/rotated QPSK modulation symbol. Alternatively, amplitude of a PTRS symbol is the same as amplitude of QPSK, and a phase difference between each two adjacent PTRS symbols is pi/2. Alternatively, amplitude of a PTRS symbol is the same as amplitude of QPSK, and a phase difference between each two adjacent PTRS symbols is −pi/2, as shown in the following table:

TABLE 5

| Modulation scheme of a data signal | Modulation scheme/Sequence of a PTRS |
| --- | --- |
| Pi/2 BPSK | Pi/2 BPSK |
| BPSK | {pi/2 QPSK, pi/4 QPSK, clockwise or counterclockwise moved QPSK} |
| QPSK | {pi/2 QPSK, pi/4 QPSK, clockwise or counterclockwise moved QPSK} |
| 16QAM | {pi/2 QPSK, pi/4 QPSK, clockwise or counterclockwise moved QPSK} |
| 64QAM | {pi/2 QPSK, pi/4 QPSK, clockwise or counterclockwise moved QPSK} |

In an embodiment, if the PTRS sequence is the clockwise or counterclockwise moved QPSK, an initial phase value may be configured based on UE. For example, different initial phase values are configured for different UEs, to increase randomness of the PTRS sequence between the UEs. The initial phase value may further be related to locations of PTRSs in all modulation symbols before DFT. For example, an initial phase value is adjusted, so that a phase difference between a PUSCH or data adjacent to a PTRS block and a PTRS symbol adjacent to the PTRS block is not equal to an integer multiple of pi; or a phase difference between the two is reduced, to reduce its impact on a PAPR.

In another embodiment, the QPSK symbol may further be replaced by a symbol of an outer most constellation point (OMCP) in a specific modulation scheme or a modulation order. The outer most constellation point is a constellation point with a largest amplitude value in the specific modulation scheme or the modulation order, as shown in the following table:

TABLE 6

| Modulation scheme of a data signal | Modulation scheme/Sequence of a PTRS |
| --- | --- |
| Pi/2 BPSK | Pi/2 BPSK |
| BPSK | {pi/2 OMCP, pi/4 OMCP, clockwise or counterclockwise moved OMCP} |
| QPSK | {pi/2 OMCP, pi/4 OMCP, clockwise or counterclockwise moved OMCP} |
| 16QAM | {pi/2 OMCP, pi/4 OMCP, clockwise or counterclockwise moved OMCP} |
| 64QAM | {pi/2 OMCP, pi/4 OMCP, clockwise or counterclockwise moved OMCP} |

In other embodiments of this application, on the basis of the foregoing embodiments, for example, the PTRS sequence is pi/2BPSK and is unrelated to the modulation scheme or the modulation order, and power boosting (Power Boosting, PB) is performed on amplitude of PTRS, to improve estimation accuracy of the PTRS. A specific value of the power boosting may be related to the modulation scheme or the modulation order or an MCS. For example, in the specific modulation scheme or modulation order, the power is boosted to be the same as a power of the outer most constellation point, as shown in the following table:

TABLE 7

| Modulation scheme of a data signal | PB value of a PTRS |
| --- | --- |
| Pi/2 BPSK | 0 dB |
| BPSK | 0 dB |
| QPSK | 0 dB |
| 16QAM | 2.5527 dB = 10*lg((3 + 3j)^2/10) |
| 64QAM | 3.6798 dB = 10*lg((7 + 7j)^2/42) |
| 256QAM | 4.2276 dB = 10*lg((15 + 15j)^2/170) |

In an embodiment, to ensure that a total power of a DFT-s-OFDM symbol is not changed, after power boosting is performed on a PTRS, a power of data or a PUSCH may be reduced. It may be understood that, the power of the data or the PUSCH that needs to be reduced is related to overheads of the PTRS and/or a power boosting value of the PTRS. For example, if the boosted power of the PTRS is the same, larger overheads of the PTRS lead to a lower data power; or if the overheads of the PTRS are the same, a larger power boosting value of the PTRS leads to a lower data power.

In another embodiment, alternatively, Table 6 may be implemented through power boosting on Table 5, or the outer most constellation point may be implemented through power boosting on a QPSK constellation point, and the power boosting value may be the same as that shown in Table 7.

It should be understood that, the power boosting value is fixed based on the modulation order, which is merely an example for description. In an embodiment, alternatively, the power boosting value may be configured through signaling, or have an offset from a value in Table 7, and offsets in different modulation schemes may be the same or different. For example, the power of the PTRS may be boosted into a power less than an OMCP power value, which can avoid or reduce performance loss introduced by that the PTRS is fallen into a non-linear region of a power amplifier or another hardware because the power is boosted into a power that is the same as the OMCP power in a specific modulation scheme. The following describes another embodiment of the present application. After receiving an orthogonal frequency division multiplexing signal including a pi/2-BPSK PTRS, a receive end may phase-shift the received pi/2-BPSK PTRS signal, to obtain a BPSK PTRS received signal. Phase noise may be estimated by dividing the BPSK PTRS received signal by a BPSK PTRS sequence, or by multiplying the BPSK PTRS received signal by a conjugate of a BPSK PTRS sequence, where the phase noise is used for data demodulation. In another embodiment, the BPSK PTRS sequence may be phase-shifted, to obtain a pi/2-BPSK PTRS sequence. Phase noise may be estimated by dividing the received pi/2-BPSK PTRS signal by the pi/2-BPSK PTRS sequence, or by multiplying the received pi/2-BPSK PTRS signal by a conjugate of a pi/2-BPSK PTRS sequence, where the phase noise is used for data demodulation. Herein, the multiplying may be a scalar multiplication operation, and the dividing may be a scalar division operation.

In an embodiment, a phase shift value of the PTRS received signal and/or the PTRS sequence may be determined based on a location of a PTRS symbol in the PTRS received signal and/or the PTRS sequence before DFT. For example, a total quantity of modulation symbols/signals before DFT is $N_{sym}$, and the modulation symbols/signals are numbered 0, 1, . . . , $N_{sym}-1$. If locations of PTRSs before DFT are a set $S_{PTRS}=\{I_{PTRS-1}, I_{PTRS-2}, \ldots\}$, a phase shift value of a PTRS received signal at a location of $I_{PTRS-1}$ is $-(\Delta\theta+I_{PTRS-i}*pi/2)$, or a phase shift value is $-(\Delta\theta+(I_{PTRS-i})*pi/2)$, or a phase shift value is $-(\Delta\theta+(I_{PTRS-i}+1)*pi/2)$. Alternatively, a phase shift value of a PTRS symbol at a location of $I_{PTRS-1}$ in the PTRS sequence is $\Delta\theta+I_{PTRS-i}*pi/2$, or a phase shift value is $\Delta\theta+(I_{PTRS-i}-1)*pi/2$, or a phase shift value is $\Delta\theta+(I_{PTRS-i}+1)*pi/2$, where $\Delta\theta$ includes initial phase shift values of all modulation symbols of data before DFT and may be 0 by default.

In another embodiment, a phase shift value of the PTRS received signal and/or the PTRS sequence may be unrelated to a location of a PTRS symbol in the PTRS received signal and/or the PTRS sequence before DFT, and is determined by a location of the PTRS symbol in the PTRS received signal and/or the PTRS sequence. For example, a phase shift value of an $i^{th}$ PTRS received signal may be $-(\Delta\theta+(i-1)*pi/2)$, or $-(\Delta\theta+i*pi/2)$, or $-(\Delta\theta+(i+1)*pi/2)$. Alternatively, a phase shift value of an $i^{th}$ PTRS symbol in the PTRS sequence may be $\Delta\theta+(i-1)*pi/2$, or $\Delta\theta+i*pi/2$, or $\Delta\theta+(i+1)*pi/2$, where $\Delta\theta$ is an initial phase shift value of the PTRS and may be 0 by default. The phase shift value of the $i^{th}$ PTRS may also be obtained by other methods. For example, phase-shifting in each PTRS block is independent, or an initial phase shift value of each PTRS block is independent. For details, refer to the foregoing description.

The foregoing two types of processing performed on the PTRS received signal and/or the PTRS sequence by the receive end may also be used in a scenario in which the PTRS sequence is another sequence, such as pi/2 QPSK, pi/4 QPSK, clockwise rotated or counterclockwise rotated QPSK, pi/2 OMCP, pi/4 OMCP, clockwise rotated or counterclockwise rotated OMCP.

The following describes another embodiment of the present application. This embodiment includes an information transmission method, specifically including: receiving, by a receive end, an orthogonal frequency division multiplexing OFDM symbol, where the OFDM symbol includes a π/2 pi/2-binary phase shift keying BPSK modulated phase tracking reference signal PTRS, and demodulating, by the receive end, a data signal based on the pi/2-BPSK modulated PTRS. In an embodiment, the method further includes: phase-shifting a BPSK modulated PTRS sequence, to obtain a pi/2-BPSK modulated PTRS sequence, where the PTRS includes one or more PTRS blocks, each PTRS block includes one or more BPSK symbols, and the BPSK symbol in each PTRS block is phase-shifted according to a pi/2 progressive increase rule. In an embodiment, that the receive end phase-shifts the BPSK symbol in each PTRS block according to a pi/2 progressive increase rule may be: phase-shifting the PTRS based on a location of a PTRS symbol in the OFDM symbol; or phase-shifting the PTRS based on a location of a PTRS symbol in a PTRS sequence. The OFDM symbol is a discrete Fourier transform spread DFT-s-OFDM symbol. The receive end may include a receiving unit, configured to receive the OFDM symbol, and the receive end may further include a processing unit, configured to demodulate the data signal. In another embodiment, the receive end may include a receiver and a processor, configured to receive the OFDM symbol and demodulate the data signal, respectively. In an embodiment, a transmit end apparatus may be a chip or a chip system.

The foregoing mainly describes solutions provided in embodiments of this application from the perspective of interaction between network elements. It may be understood that the network elements may be, for example, a transmit end device or a receive end device. To implement the foregoing functions, the network elements include a corresponding hardware structure and/or software module for performing the functions. A person skilled in the art should easily be aware that, in combination with units and algorithm steps in examples described in the embodiments disclosed in this specification, this application may be implemented by hardware or a combination form of hardware and computer software. Whether a function is performed by hardware or hardware driven by computer software depends on a particular application and a design constraint of the technical solution. A person skilled in the art may use different methods to implement the described functions for each particular application, but it should not be considered that the implementation goes beyond the scope of this application.

The transmit end device or the receive end device may be divided into function modules based on the foregoing method examples in the embodiments of this application. For example, the function modules may be divided based on corresponding functions, or two or more functions may be integrated into one processing module. The foregoing integrated module may be implemented in a form of hardware, or may be implemented in a form of a software function module. It should be noted that the module division in the embodiments of this application is an example, and is merely logical function division. There may be another division manner during actual implementation. An example in which division of the function modules is based on corresponding functions is used below for description.

An embodiment of this application further provides an information transmission apparatus, and the information transmission apparatus may be a transmit end device. The transmit end device may be configured to perform the steps performed by the transmit end device in FIG. 6 or FIG. 12.

An embodiment of this application further provides an information transmission apparatus, and the information transmission apparatus may be a receive end device. The receive end device may be configured to perform the steps performed by the receive end device in FIG. 6 or FIG. 12.

Figure 15:
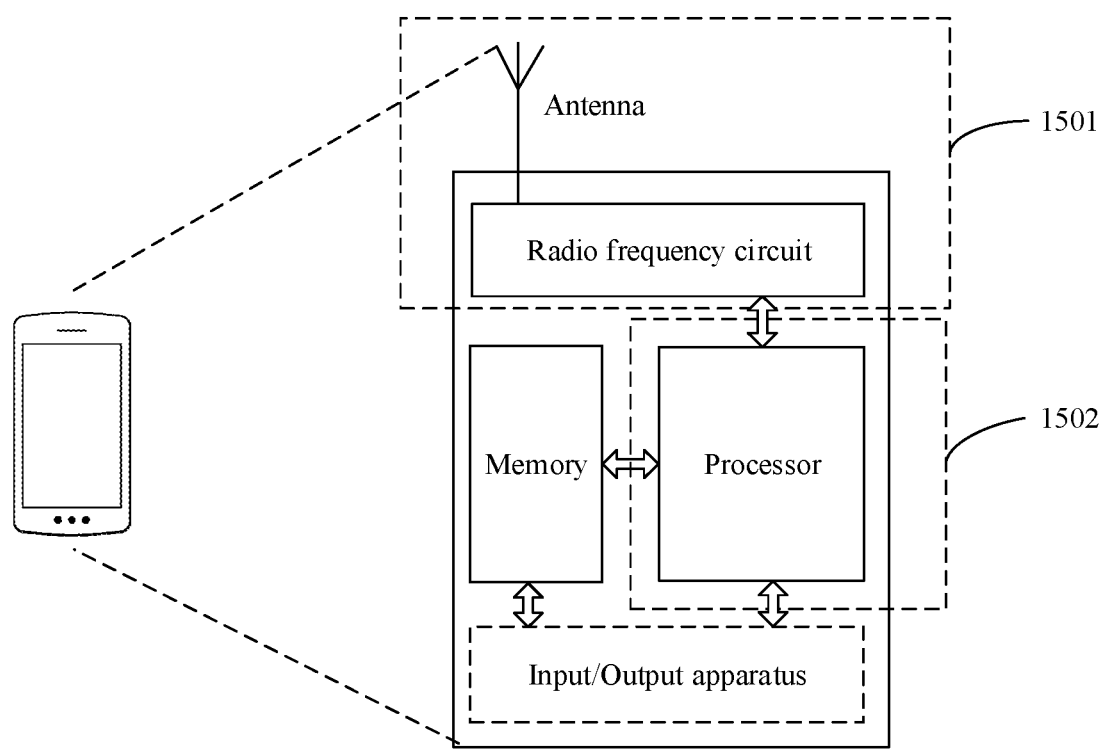
FIG. 15 is a schematic structural diagram of an information transmission apparatus according to an embodiment of this application.

In an uplink single carrier transmission scenario, the transmit end device may be a terminal. FIG. 15 is a simplified schematic structural diagram of a terminal. For ease of understanding and illustration, in FIG. 15, for example, the terminal is a mobile phone. As shown in FIG. 15, the terminal includes a processor, a memory, a radio frequency circuit, an antenna, and an input/output apparatus. The processor is configured to process a communication protocol and communication data, control the terminal, execute a software program, process data of the software program, or the like. The memory is configured to store the software program and the data. The radio frequency circuit is configured to: perform conversion between a baseband signal and a radio frequency signal, and process the radio frequency signal. The antenna is configured to receive and send a radio frequency signal in an electromagnetic wave form. The input/output apparatus such as a touchscreen, a display, or a keyboard is configured to: receive data entered by a user, and output data to the user. It should be noted that some types of terminals may not have an input/output apparatus.

When data needs to be sent, the processor outputs a baseband signal to the radio frequency circuit after performing baseband processing on the to-be-sent data. After performing radio frequency processing on the baseband signal, the radio frequency circuit sends a radio frequency signal in an electromagnetic wave form through the antenna. When there is data sent to the terminal, the radio frequency circuit receives a radio frequency signal through the antenna, converts the radio frequency signal into a baseband signal, and outputs the baseband signal to the processor. The processor converts the baseband signal into data, and processes the data. For ease of description, only one memory and one processor are shown in FIG. 15. In an actual terminal product, there may be one or more processors and one or more memories. The memory may also be referred to as a storage medium, a storage device, or the like. The memory may be disposed independently of the processor, or may be integrated with the processor. This is not limited in this embodiment of this application.

In this embodiment of this application, an antenna and a radio frequency circuit that have a sending or receiving function may be considered as a transceiver unit of the terminal, and a processor having a processing function is considered as a processing unit of the terminal. As shown in FIG. 15, the terminal includes a transceiver unit 1501 and a processing unit 1502. The transceiver unit may also be referred to as a transceiver, a transceiver apparatus, or the like. The processing unit may also be referred to as a processor, a processing board, a processing module, a processing apparatus, or the like. Optionally, a component for implementing a receiving function in the transceiver unit 1501 may be considered as a receiving unit, and a component for implementing a sending function in the transceiver unit 1501 may be considered as a sending unit. In other words, the transceiver unit 1501 includes a receiving unit and a sending unit. Sometimes, the transceiver unit may also be referred to as a transceiver, a transceiver circuit, or the like. Sometimes, the receiving unit may also be referred to as a receiver, a receiver circuit, or the like. Sometimes, the sending unit may also be referred to as a transmitter, a transmitter circuit, or the like.

For example, in an implementation, the processing unit 1502 is configured to perform any one or more steps in S102 to S106 in FIG. 6, and/or other steps in this application. The transceiver unit 1501 performs the step performed by the transmit end device in S108 in FIG. 6, and/or other steps in this application. For another example, in an implementation, the processing unit 1502 is configured to perform any one or more steps in S202 to S206 in FIG. 12, and/or other steps in this application. The transceiver unit 1502 performs the step performed by the transmit end device in S208 in FIG. 12, and/or other steps in this application.

Figure 16:
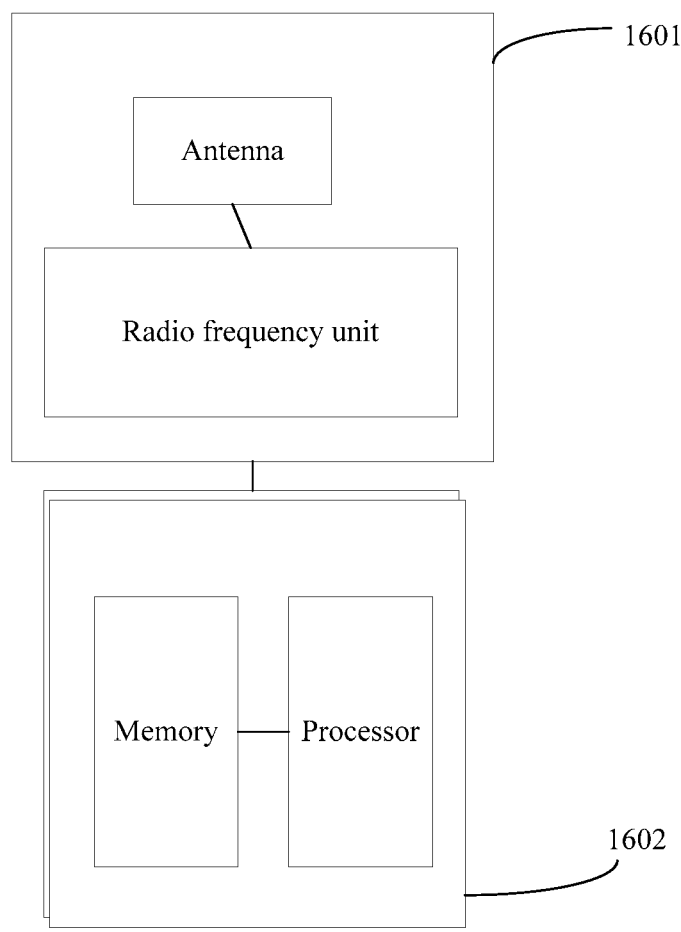
FIG. 16 is a schematic structural diagram of another information transmission apparatus according to an embodiment of this application.

In the uplink single carrier transmission scenario, the receive end device may also be a base station. FIG. 16 is a simplified schematic structural diagram of a base station. The base station includes a part 1601 and a part 1602. The part 1601 is configured to send or receive a radio frequency signal and perform conversion between the radio frequency signal and a baseband signal. The part 1602 is configured to perform baseband processing and control the base station, or the like. The part 1601 may usually be referred to as a transceiver unit, a transceiver, a transceiver circuit, or the like. The part 1602 is usually a control center of the base station, and may usually be referred to as a processing unit, configured to control the base station to perform the steps performed by the receive end device in FIG. 6 or FIG. 12. For details, refer to the description of the foregoing related parts.

The transceiver unit of the part 1601 may also be referred to as a transceiver, a transceiver, or the like, and the transceiver unit includes an antenna and a radio frequency unit. The radio frequency unit is configured to perform radio frequency processing. Optionally, a component for implementing a receiving function in the part 1601 may be considered as a receiving unit, and a component for implementing a sending function may be considered as a sending unit. In other words, the part 1601 includes a receiving unit and a sending unit. The receiving unit may also be referred to as a receiver, a receiving circuit, or the like, and the sending unit may be referred to as a transmitter, a transmitter, a transmitter circuit, or the like.

The part 1602 may include one or more boards. Each board may include one or more processors and one or more memories. The processor is configured to read and execute a program in the memory to implement a baseband processing function and control the base station. If a plurality of boards exist, the boards may be interconnected to increase a processing capability. In an optional implementation, the plurality of boards may share one or more processors, or the plurality of boards share one or more memories, or the plurality of boards simultaneously share one or more processors.

For example, in an implementation, the transceiver unit is configured to perform the step performed by the receive end device in S108 in FIG. 6, and/or other steps in this application. The processing unit is configured to perform any one or more steps in S110 to S111 in FIG. 6, and/or other steps in this application. For another example, in an implementation, the transceiver unit is configured to perform the step performed by the receive end device in S208 in FIG. 12, and/or other steps in this application. The processing unit is configured to perform any one or more steps in S110 to S111 in FIG. 12, and/or other steps in this application.

In a downlink single carrier transmission scenario, the transmit end device may be a base station. FIG. 16 is a simplified schematic structural diagram of a base station. For related explanations, refer to the foregoing description. For example, in an implementation, the transceiver unit is configured to perform the step performed by the transmit end device in S108 in FIG. 6, and/or other steps in this application. The processing unit is configured to perform any one or more steps in S102 to S106 in FIG. 6, and/or other steps in this application. For another example, in an implementation, the transceiver unit is configured to perform the step performed by the transmit end device in S208 in FIG. 12, and/or other steps in this application. The processing unit is configured to perform any one or more steps in S202 to S206 in FIG. 12, and/or other steps in this application.

In the downlink single carrier transmission scenario, the receive end device may be a terminal. FIG. 15 is a simplified schematic structural diagram of a terminal. For related explanations, refer to the foregoing description. For example, in an implementation, the transceiver unit is configured to perform the step performed by the receive end device in S108 in FIG. 6, and/or other steps in this application. The processing unit is configured to perform any one or more steps in S110 to S111 in FIG. 6, and/or other steps in this application. For example, in an implementation, the transceiver unit is configured to perform the step performed by the receive end device in S208 in FIG. 12, and/or other steps in this application. The processing unit is configured to perform any one or more steps in S210 to S211 in FIG. 12, and/or other steps in this application.

For explanations of related content and beneficial effects of any one of the information transmission apparatuses provided above, refer to the corresponding method embodiments provided above. Details are not described herein again.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instruction is loaded and executed on a computer, the procedure or functions according to the embodiments of this application are completely or partially generated. The computer may be a general-purpose computer, a dedicated computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center that is integrated by using one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

Although this application is described with reference to the foregoing embodiments, in a process of implementing this application, persons skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Although this application is described with reference to exemplary features and the embodiments thereof, various modifications and combinations may be made to this application without departing from the spirit and scope of this application. Correspondingly, the specification and accompanying drawings are merely exemplary. A person skilled in the art can make various modifications and variations to this application without departing from the spirit and scope of this application. This application is intended to cover these modifications and variations of this application provided that these modifications and variations fall within the scope of protection defined by the following claims and their equivalent technologies.

What is claimed is:

1. A communication method, comprising:
    generating, by a transmit end device, a sequence;
    mapping, by the transmit end device, the sequence to an orthogonal frequency division multiplexing (OFDM) symbol, wherein the sequence comprises a pi/2-binary phase shift keying (BPSK) modulated data signal and a pi/2-BPSK modulated phase tracking reference signal (PTRS); and
    sending, by the transmit end device, the OFDM symbol to a receive end device;
    wherein the pi/2-BPSK modulated PTRS comprises one or more PTRS blocks, and each PTRS block comprises one or more consecutive pi/2-BPSK modulated symbols; and
    wherein a respective phase shift amount of a respective pi/2-BPSK modulated symbol in the pi/2-BPSK modulated PTRS is related to a location of the respective pi/2-BPSK modulated symbol in the sequence.

2. The method according to claim 1, wherein the method further comprises:
    phase-shifting a BPSK modulated PTRS to obtain the pi/2-BPSK modulated PTRS.

3. The method according to claim 1, wherein the one or more consecutive pi/2-BPSK modulated symbols in each PTRS block are obtained by phase-shifting one or more BPSK modulated symbols according to a pi/2 progressive increase rule after a pi modulo operation.

4. The method according to claim 3, wherein phase-shifting the one or more BPSK modulated symbols according to the pi/2 progressive increase rule after the pi modulo operation further comprises:
    phase-shifting the one or more BPSK modulated symbols based on an arrangement order of the one or more BPSK modulated symbols according to the pi/2 progressive increase rule after the pi modulo operation.

5. The method according to claim 1, wherein the pi/2-BPSK modulated data signal comprises one or more data parts, and each data part comprises one or more consecutive pi/2-BPSK modulated symbols; and
    wherein the respective phase shift amount of a respective pi/2-BPSK modulated symbol in the pi/2-BPSK modulated PTRS is $\pi/2*\mod(k, 4)$, wherein a quantity of pi/2-BPSK modulated symbols in each PTRS block and a quantity of pi/2-BPSK modulated symbols in each data part are integer multiples of 4, and k is an integer.

6. The method according to claim 1, wherein the pi/2-BPSK modulated data signal comprises one or more data parts, and each data part comprises one or more consecutive pi/2-BPSK modulated symbols; and
    wherein the respective phase shift amount of a respective pi/2-BPSK modulated symbol in the pi/2-BPSK modulated PTRS is $\pi/2*\mod(k, 2)$, wherein a quantity of pi/2-BPSK modulated symbols in each PTRS block and a quantity of pi/2-BPSK modulated symbols in each data part are integer multiples of 2, and k is an integer.

7. The method according to claim 1, wherein the OFDM symbol is a discrete Fourier transform-spread-OFDM (DFT-s-OFDM) symbol.

8. A communication apparatus, comprising:
    one or more non-transitory memories configured to store instructions; and
    one or more processors coupled to the one or more non-transitory memories, wherein the one or more processors are configured to execute the instructions to facilitate:
    generating a sequence;
    mapping the sequence to an orthogonal frequency division multiplexing (OFDM) symbol, wherein the sequence comprises a pi/2-binary phase shift keying (BPSK) modulated data signal and a pi/2-BPSK modulated phase tracking reference signal (PTRS); and sending the OFDM symbol to another communication apparatus;

wherein the pi/2-BPSK modulated PTRS comprises one or more PTRS blocks, and each PTRS block comprises one or more consecutive pi/2-BPSK modulated symbols; and wherein a respective phase shift amount of a respective pi/2-BPSK modulated symbol in the pi/2-BPSK modulated PTRS is related to a location of the respective pi/2-BPSK modulated symbol in the sequence.

9. The apparatus according to claim 8, wherein the one or more processors are further configured to execute the instructions to facilitate:

phase-shifting a BPSK modulated PTRS to obtain the pi/2-BPSK modulated PTRS.

10. The apparatus according to claim 8, wherein the one or more processors are further configured to execute the instructions to facilitate:

phase-shifting one or more BPSK modulated symbols according to a pi/2 progressive increase rule after a pi modulo operation to obtain the one or more consecutive pi/2-BPSK modulated symbols in each PTRS block.

11. The apparatus according to claim 10, wherein phase-shifting the one or more BPSK modulated symbols according to the pi/2 progressive increase rule after the pi modulo operation further comprises:

phase-shifting the one or more BPSK modulated symbols based on an arrangement order of the one or more BPSK modulated symbols according to the pi/2 progressive increase rule after the pi modulo operation.

12. The apparatus according to claim 8, wherein the pi/2-BPSK modulated data signal comprises one or more data parts, and each data part comprises one or more consecutive pi/2-BPSK modulated symbols; and wherein the respective phase shift amount of a respective pi/2-BPSK modulated symbol in the pi/2-BPSK modulated PTRS is $\pi/2*\mod(k, 4)$, wherein a quantity of pi/2-BPSK modulated symbols in each PTRS block and a quantity of pi/2-BPSK modulated symbols in each data part are integer multiples of 4, and k is an integer.

13. The apparatus according to claim 8, wherein the pi/2-BPSK modulated data signal comprises one or more data parts, and each data part comprises one or more consecutive pi/2-BPSK modulated symbols;

wherein the respective phase shift amount of a respective pi/2-BPSK modulated symbol in the pi/2-BPSK modulated PTRS is $\pi/2*\mod(k, 2)$, wherein a quantity of pi/2-BPSK modulated symbols in each PTRS block and a quantity of pi/2-BPSK modulated symbols in each data part are integer multiples of 2, and k is an integer.

14. A communication method, comprising:

receiving, by a receive end device, an orthogonal frequency division multiplexing (OFDM) signal; and obtaining, by the receive end device, a sequence from the OFDM signal, wherein the sequence comprises a pi/2-binary phase shift keying (BPSK) modulated data signal and a pi/2-BPSK modulated phase tracking reference signal (PTRS);

wherein the pi/2-BPSK modulated PTRS comprises one or more PTRS blocks, and each PTRS block comprises one or more consecutive pi/2-BPSK modulated symbols; and wherein a respective phase shift amount of a respective pi/2-BPSK modulated symbol in the pi/2-BPSK modulated PTRS is related to a location of the respective pi/2-BPSK modulated symbol in the sequence.

15. The method according to claim 14, wherein the one or more consecutive pi/2-BPSK modulated symbols in each PTRS block are phase-shifted according to a pi/2 progressive increase rule after a pi modulo operation.

16. The method according to claim 14, wherein the one or more consecutive pi/2-BPSK modulated symbols in each PTRS block are phase-shifted based on an arrangement order of the one or more consecutive pi/2-BPSK modulated symbols and according to a pi/2 progressive increase rule after a pi modulo operation.

17. The method according to claim 14, wherein the pi/2-BPSK modulated data signal comprises one or more data parts, and each data part comprises one or more consecutive pi/2-BPSK modulated symbols; and wherein the respective phase shift amount of a respective pi/2-BPSK modulated symbol in the pi/2-BPSK modulated PTRS is $\pi/2*\mod(k, 4)$, wherein a quantity of pi/2-BPSK modulated symbols in each PTRS block and a quantity of pi/2-BPSK modulated symbols in each data part are integer multiples of 4, and k is an integer.

18. The method according to claim 14, wherein the pi/2-BPSK modulated data signal comprises one or more data parts, and each data part comprises one or more consecutive pi/2-BPSK modulated symbols; and wherein the respective phase shift amount of a respective pi/2-BPSK modulated symbol in the pi/2-BPSK modulated PTRS is $\pi/2*\mod(k, 2)$, wherein a quantity of pi/2-BPSK modulated symbols in each PTRS block and a quantity of pi/2-BPSK modulated symbols in each data part are integer multiples of 2, and k is an integer.

19. A communication apparatus, comprising:

one or more non-transitory memories configured to store instructions; and one or more processors coupled to the one or more non-transitory memories, wherein the one or more processors are configured to execute the instructions to facilitate:

receiving an orthogonal frequency division multiplexing (OFDM) signal; and obtaining a sequence from the OFDM signal, wherein the sequence comprises a pi/2-binary phase shift keying (BPSK) modulated data signal and a pi/2-BPSK modulated phase tracking reference signal (PTRS);

wherein the pi/2-BPSK modulated PTRS comprises one or more PTRS blocks, and each PTRS block comprises one or more consecutive pi/2-BPSK modulated symbols; and wherein a respective phase shift amount of a respective pi/2-BPSK modulated symbol in the pi/2-BPSK modulated PTRS is related to a location of the respective pi/2-BPSK modulated symbol in the sequence.

20. The apparatus according to claim 19, wherein the one or more consecutive pi/2-BPSK modulated symbols in each PTRS block are phase-shifted according to a pi/2 progressive increase rule after a pi modulo operation.

21. The apparatus according to claim 19, wherein the one or more consecutive pi/2-BPSK modulated symbols in each PTRS block are phase-shifted based on an arrangement order of the one or more consecutive pi/2-BPSK modulated symbols and according to a pi/2 progressive increase rule after a pi modulo operation.

22. The apparatus according to claim 19, wherein the pi/2-BPSK modulated data signal comprises one or more data parts, and each data part comprises one or more consecutive pi/2-BPSK modulated symbols; and wherein the respective phase shift amount of a respective pi/2-BPSK modulated symbol in the pi/2-BPSK modulated PTRS is $\pi/2*\text{mod}(k, 4)$, wherein a quantity of pi/2-BPSK modulated symbols in each PTRS block and a quantity of pi/2-BPSK modulated symbols in each data part are integer multiples of 4, and k is an integer.

23. The apparatus according to claim 19, wherein the pi/2-BPSK modulated data signal comprises one or more data parts, and each data part comprises one or more consecutive pi/2-BPSK modulated symbols; and wherein the respective phase shift amount of a respective pi/2-BPSK modulated symbol in the pi/2-BPSK modulated PTRS is $\pi/2*\text{mod}(k, 2)$, wherein a quantity of pi/2-BPSK modulated symbols in each PTRS block and a quantity of pi/2-BPSK modulated symbols in each data part are integer multiples of 2, and k is an integer.

* * * * *